US011258327B2

United States Patent
Kinouchi et al.

(10) Patent No.: US 11,258,327 B2
(45) Date of Patent: Feb. 22, 2022

(54) ROTATING ELECTRIC MACHINE HAVING MAGNETIC WEDGE WITH PLANES AND HAVING DIFFERENCES IN MAGNETIC PERMEABILITY

(71) Applicant: KABUSHIKI KAISHA TOSHIBA, Tokyo (JP)

(72) Inventors: Hiroaki Kinouchi, Tokyo (JP); Tomohiro Suetsuna, Kanagawa (JP); Takahiro Kawamoto, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 426 days.

(21) Appl. No.: 16/274,372

(22) Filed: Feb. 13, 2019

(65) Prior Publication Data

US 2019/0238021 A1    Aug. 1, 2019

Related U.S. Application Data

(63) Continuation of application No. PCT/JP2018/010475, filed on Mar. 16, 2018.

(30) Foreign Application Priority Data

Sep. 21, 2017    (JP) .............................. JP2017-181753

(51) Int. Cl.
*H02K 3/493*        (2006.01)
*H01F 1/055*        (2006.01)

(52) U.S. Cl.
CPC ............. *H02K 3/493* (2013.01); *H01F 1/055* (2013.01)

(58) Field of Classification Search
CPC ............. H02K 15/0018; H02K 15/022; H02K 15/024; H02K 3/46; H02K 3/48;
(Continued)

(56) References Cited

U.S. PATENT DOCUMENTS 2,015,554 A * 9/1935 Fisher .................... H02K 3/493
                                                   310/214
2,386,673 A * 10/1945 Fisher .................... H02K 3/493
                                                   310/214
(Continued)

FOREIGN PATENT DOCUMENTS

JP        52-006906        1/1977
JP        58-19138         2/1983
(Continued)

OTHER PUBLICATIONS

International Search Report and Written Opinion for International Application No. PCT/JP2018/010475 dated Jul. 16, 2018, 13 pgs.
(Continued)

*Primary Examiner* — Maged M Almawri
(74) *Attorney, Agent, or Firm* — Amin, Turocy & Watson, LLP

(57) ABSTRACT

The magnetic wedge of embodiments is a magnetic wedge used for a rotating electrical machine and includes magnetic bodies having a planar structure having a principal plane. The principal planes of the magnetic bodies are disposed approximately perpendicularly to the air-gap surface between a stator and a rotor of a rotating electrical machine. The magnetic bodies have differences in the axial direction magnetic permeability in the axial direction of the rotating electrical machine, the rotational direction magnetic permeability in the direction of rotation, and the diametric direction magnetic permeability in the direction of the diameter.

16 Claims, 18 Drawing Sheets

(58) Field of Classification Search
CPC ........ H02K 3/487; H02K 3/493; H02K 3/527;
H02K 1/22; H02K 1/223; H02K 1/26;
H02K 1/265; H02K 1/27; H02K 19/00
USPC ..... 310/214, 215, 156.19, 216.082, 216.125,
310/216.126
See application file for complete search history.

(56) References Cited

U.S. PATENT DOCUMENTS

| | | | | |
|---|---|---|---|---|
| 2,710,931 | A * | 6/1955 | Tittel | H02K 3/493 428/546 |
| 4,040,971 | A * | 8/1977 | Simmonds | H02K 3/493 252/62.54 |
| 4,761,581 | A | 8/1988 | Watanabe et al. | |
| 5,252,877 | A | 10/1993 | Sawa et al. | |
| 5,258,681 | A | 11/1993 | Hibino et al. | |
| 5,469,009 | A * | 11/1995 | Wakui | H02K 1/265 310/179 |
| 5,651,841 | A * | 7/1997 | Moro | H01F 1/26 148/309 |
| 5,654,603 | A * | 8/1997 | Sung | H02K 3/493 310/214 |
| 6,310,837 | B1 * | 10/2001 | Chou | G06K 19/06196 369/13.38 |
| 6,882,079 | B2 * | 4/2005 | Kilpatrick | H02K 3/487 310/214 |
| 9,667,113 | B2 * | 5/2017 | Kubo | H02K 1/246 |
| 10,071,421 | B2 * | 9/2018 | Suetsuna | C22C 38/02 |
| 10,090,088 | B2 | 10/2018 | Suetsuna et al. | |
| 10,570,494 | B2 * | 2/2020 | Hosek | C23C 4/129 |
| 10,774,404 | B2 * | 9/2020 | Suetsuna | B22F 9/04 |
| 10,937,576 | B2 * | 3/2021 | Suetsuna | B22F 1/02 |
| 2004/0004407 | A1 * | 1/2004 | Laurent | H02K 1/2773 310/156.48 |
| 2007/0193657 | A1 * | 8/2007 | Brunner | H01F 1/15333 148/105 |
| 2011/0217543 | A1 * | 9/2011 | Suetsuna | B32B 5/16 428/323 |
| 2013/0228716 | A1 * | 9/2013 | Suetsuna | B22F 1/02 252/62.55 |
| 2014/0028145 | A1 * | 1/2014 | Luise | H02K 3/493 310/214 |
| 2014/0097377 | A1 * | 4/2014 | Igarashi | B22F 5/006 252/62.54 |
| 2015/0083959 | A1 * | 3/2015 | Eguchi | H01F 1/22 252/62.54 |
| 2016/0086728 | A1 * | 3/2016 | Suetsuna | C22C 1/00 148/105 |
| 2017/0018341 | A1 * | 1/2017 | Horiuchi | B22F 3/10 |
| 2017/0018978 | A1 * | 1/2017 | Horiuchi | H02K 1/27 |
| 2017/0076845 | A1 * | 3/2017 | Suetsuna | H01F 1/28 |
| 2017/0209924 | A1 * | 7/2017 | Suetsuna | C22C 38/02 |
| 2018/0123415 | A1 * | 5/2018 | Hosek | H02K 1/22 |
| 2019/0081525 | A1 * | 3/2019 | Samanta | H02K 1/165 |
| 2019/0157932 | A1 * | 5/2019 | Patel | B33Y 80/00 |
| 2020/0035391 | A1 | 1/2020 | Suetsuna et al. | |

FOREIGN PATENT DOCUMENTS

| | | |
|---|---|---|
| JP | 62-260536 | 11/1987 |
| JP | 62-262626 | 11/1987 |
| JP | 4-64956 | 6/1992 |
| JP | 4-46063 | 7/1992 |
| JP | 04-351440 | 12/1992 |
| JP | 05-022885 | 1/1993 |
| JP | 07-123621 | 5/1995 |
| JP | 07-227053 | 8/1995 |
| JP | 2000-166156 | 6/2000 |
| JP | 2017-59816 | 3/2017 |
| JP | 2017-135358 | 8/2017 |

OTHER PUBLICATIONS

Halder, et al. "Separation of particle size and lattice strain in integral breadth measurements", Acta. Cryst. 1966, pp. 312-313.

* cited by examiner

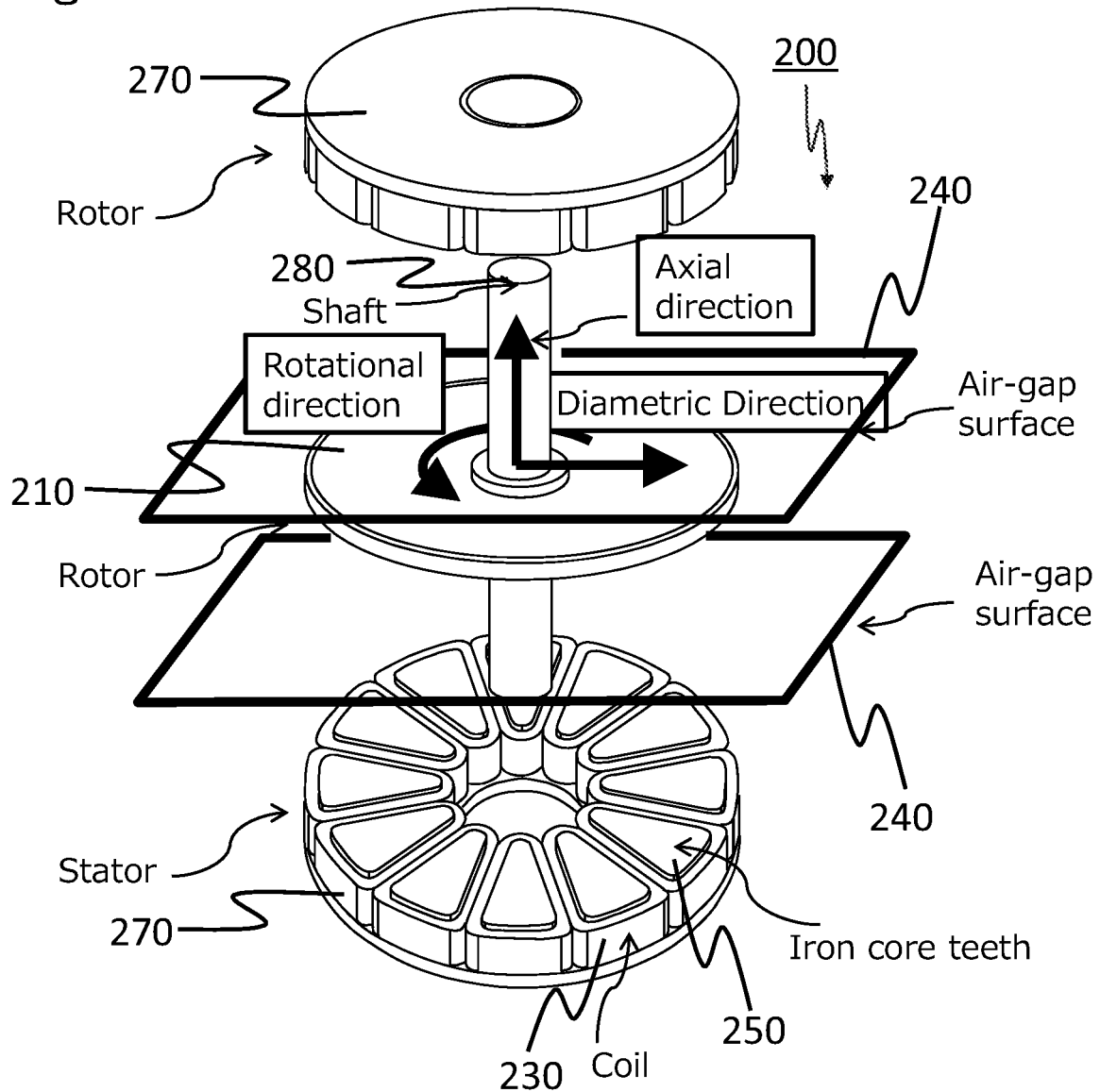

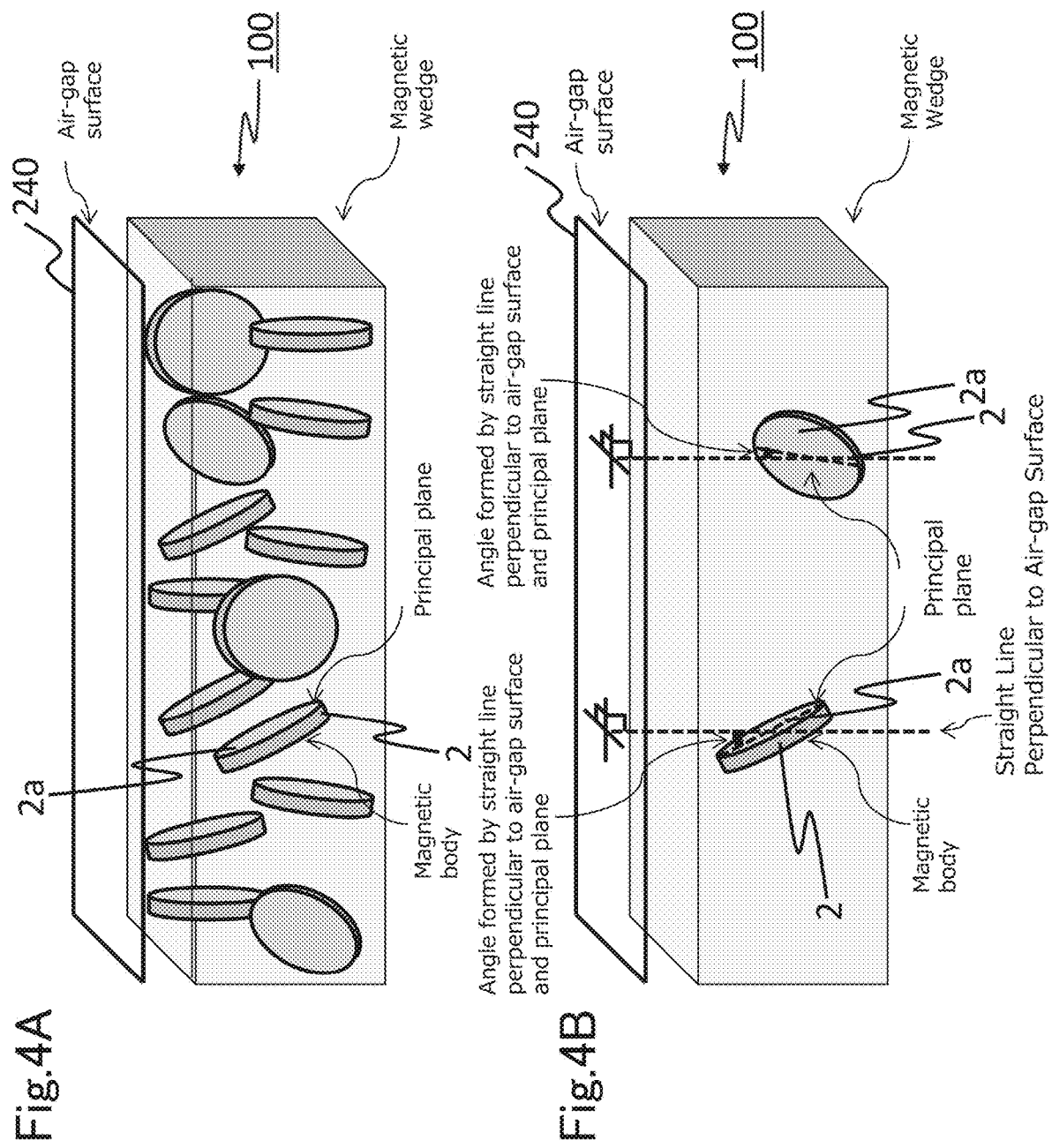

ROTATING ELECTRIC MACHINE HAVING
MAGNETIC WEDGE WITH PLANES AND
HAVING DIFFERENCES IN MAGNETIC
PERMEABILITY

CROSS-REFERENCE TO RELATED APPLICATION

This application is continuation application of, and claims the benefit of priority from Japanese Patent Application No. 2017-181753, filed on Sep. 21, 2017, and the International Application PCT/JP2018/010475, filed on Mar. 16, 2018, the entire contents of which are incorporated herein by reference.

FIELD

Embodiments described herein relate generally to a magnetic wedge and a rotating electric machine.

BACKGROUND

Usually, the coil winding of a rotating electrical machine is accommodated within an iron core slot, and the coil winding is supported and fixed by wedges provided at the slot openings. Regarding the material of these wedges, a non-magnetic material is generally employed; however, since the magnetic resistance value in an air-gap between the stator core and the rotor core becomes discontinuous, pulsation occurs in the magnetic flux distribution of the iron core surface part that faces the wedges, with an air-gap being disposed therebetween, and the harmonic loss increases. For the purpose of reducing this harmonic loss, wedges having moderate magnetism (magnetic wedges) have been previously provided. FIG. 1 is a schematic diagram illustrating the usage state of a magnetic wedge and the effect of a magnetic wedge. FIG. 1 shows a radial gap type rotating electrical machine as an example.

FIG. 1 describes a magnetic wedge 100, a coil 230, an iron core tooth 250, and an iron core slot 260.

In regard to the magnetic wedge, it is needless to say that as the magnetic permeability of the magnetic wedge is higher, the harmonic loss can be reduced. However, since magnetic wedges are disposed so as to bridge between adjacent iron core teeth as shown in FIG. 1, there is a defect that the leakage flux flowing between the iron core teeth via the magnetic wedges is increased.

BRIEF DESCRIPTION OF THE DRAWINGS

FIG. 3 is a schematic diagram illustrating an axial gap type rotating electrical machine of the first embodiment.

FIGS. 4A and 4B are schematic diagrams illustrating a magnetic wedge of the first embodiment.

DETAILED DESCRIPTION

First Embodiment

The magnetic wedge of embodiments is a magnetic wedge used in a rotating electrical machine, and contains magnetic bodies having a planar structure having a principal plane. The principal plane of a magnetic body is disposed approximately perpendicularly to an air-gap surface between a stator and a rotor of a rotating electrical machine. The magnetic wedge has differences in the axial direction magnetic permeability in the axial direction of the rotating electrical machine, the rotational direction magnetic permeability in the direction of rotation, and the diametric direction magnetic permeability in the direction of diameter.

According to the present specification, the various directions of the "axial direction", "rotational direction", and "diametric direction" will be defined on the basis of the rotor of the rotating electrical machine. That is, the "axial direction" means a direction that follows the rotational axis of the rotor, and the "rotational direction" means a circumferential direction around the rotational axis (or a tangential direction thereof) of the rotor. The "diametric direction" means a direction orthogonally intersecting the axis of rotation of the rotor.

Figure 1:
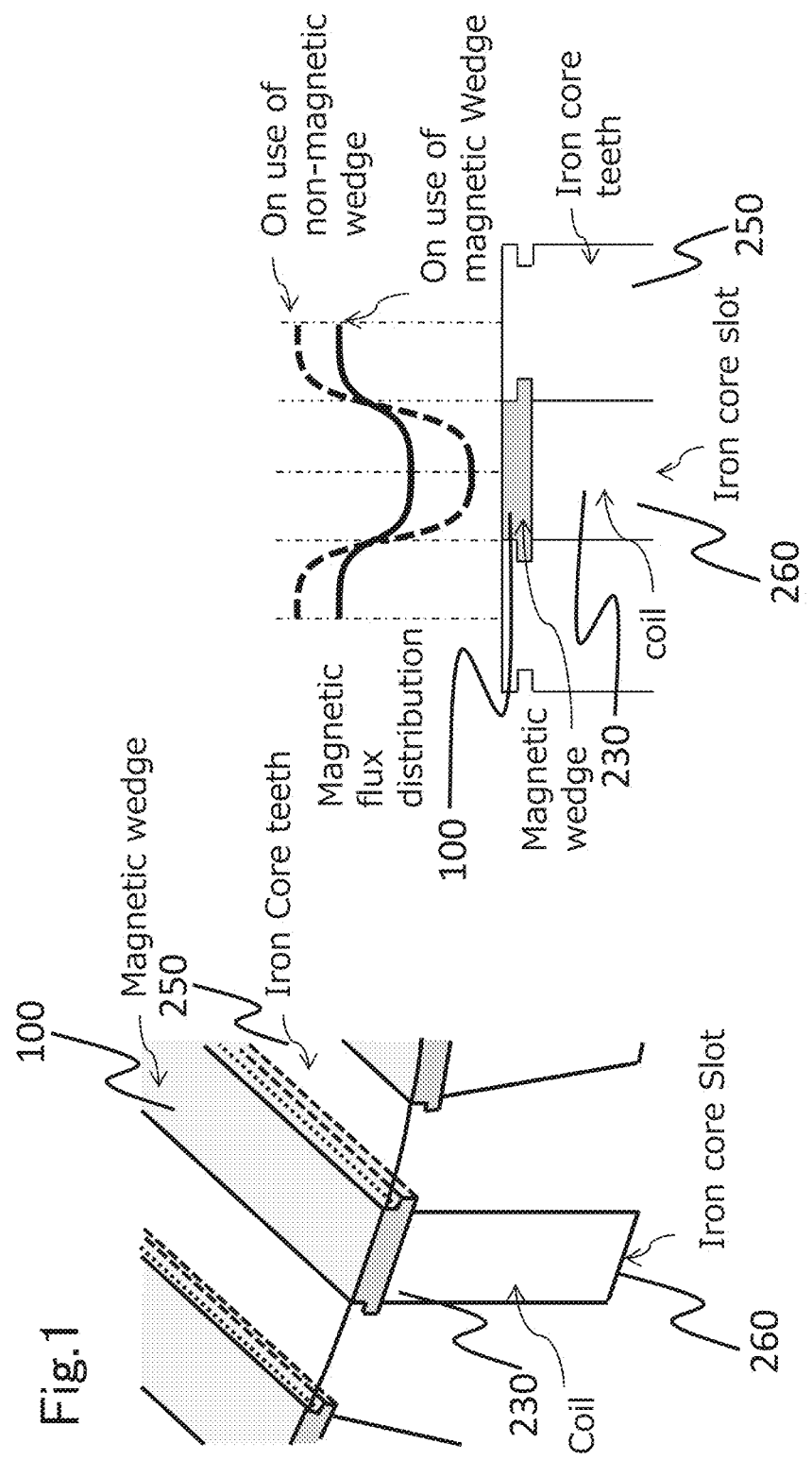
FIG. 1 is a schematic diagram illustrating the usage state of a magnetic wedge and the effect of a magnetic wedge.
Figure 2:
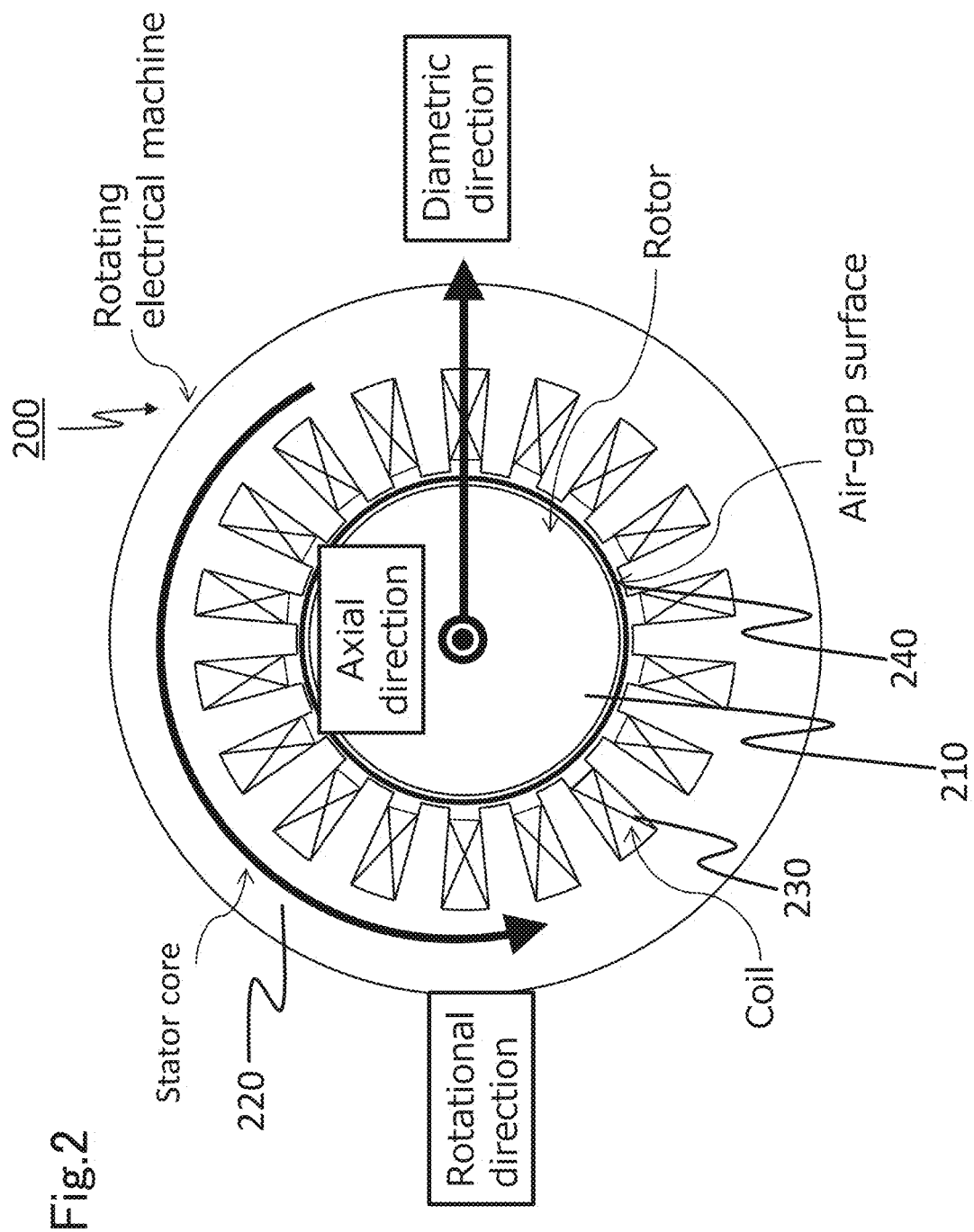
FIG. 2 is a schematic diagram illustrating a radial gap type rotating electrical machine of a first embodiment.

The "air-gap surface" is defined from the air-gap between the rotor and the stator. The "air-gap surfaces" of a radial gap type rotating electrical machine and an axial gap type rotating electrical machine will be explained using FIG. 2 and FIG. 3. FIG. 2 is a schematic diagram of a radial gap type rotating electrical machine of the present embodiment.

FIG. 3 is a schematic diagram of an axial gap type rotating electrical machine of the present embodiment.

FIG. 2 shows a rotating electrical machine 200, a rotor 210, a stator core 220, a coil 230, and an air-gap surface 240.

FIG. 3 shows a rotating electrical machine 200, a rotor, 210, a coil 230, an air-gap surface 240, iron core teeth 250, a stator, 270, and a shaft 280.

In the case of the radial gap type rotating electrical machine, as illustrated in FIG. 2, since a stator is disposed to face the rotor with a predetermined distance provided in the diametric direction, the "air-gap surface" is a surface parallel to a cylindrical plane centered around the rotational axis of the rotor. Therefore, the diametric direction becomes a direction perpendicular to the air-gap surface, and the axial direction and the rotational direction become directions parallel to the air-gap surface.

Meanwhile, in the case of the axial gap type rotating electrical machine, as illustrated in FIG. 3, since the stator is disposed to face the rotor with a predetermined distance provided in the axial direction, the "air-gap surface" is a plane orthogonally intersecting the rotational axis of the rotor. Therefore, the axial direction becomes a direction perpendicular to the air-gap surface, and the rotational direction and the diametric direction become directions parallel to the air-gap surface.

In regard to the magnetic wedge of the present embodiment, it is preferable that the magnetic permeabilities in the three directions, namely, the axial direction magnetic permeability, the rotational direction magnetic permeability, and the diametric direction magnetic permeability, have differences. More preferably, the proportion of the differences is preferably 10% or more, more preferably 50% or more, and even more preferably 100% or more. Thereby, an increase in the leakage flux caused by the use of the magnetic wedge can be suppressed, and an effect of increasing the efficiency of the rotating electrical machine can be sufficiently enjoyed. Therefore, it is preferable. Furthermore, as the effective flux (main magnetic flux) increases, an increase in the torque of the rotating electrical machine can also be anticipated.

The proportion of the difference of magnetic permeabilities is defined on the basis of the lower magnetic permeability. For example, the proportion of the difference between the diametric direction magnetic permeability $\mu r$ and the rotational direction magnetic permeability $\mu\theta$ is calculated by the formula: $(\mu r - \mu\theta)/\mu\theta \times 100(\%)$ in a case in which the rotational direction magnetic permeability is low, and the proportion is calculated by the formula: $(\mu\theta - \mu r)/\mu r \times 100(\%)$ in a case in which the diametric direction magnetic permeability is low.

FIGS. 4A and 4B are schematic diagrams of the magnetic wedge of the present embodiment.

FIGS. 4A and 4B shows a magnetic wedge 100, a magnetic body 2, a first face 2a, and an air-gap surface 240.

The magnetic wedge contains magnetic bodies having a planar structure having a principal plane. A magnetic body as the magnetic body having a planar structure includes at least one selected from the group consisting of a flaky particle, a thin band (ribbon), a thin film, a thick film, and a plate-shaped member. The flaky particle is a flaky particle (flattened particle) having a flaky (flattened) shape (flaky shape or flattened shape). The thin band (ribbon) refers to a ribbon-shaped body having a thickness of from about several μm to about one hundred μm, the thin film refers to a thin film having a thickness of from about several nm to about 10 μm, the thick film is a thick film having a thickness of from about several μm to about several hundred μm, and the plate-shaped member refers to a plate-shaped member having a thickness of from about one hundred μm to about several hundred mm. However, these bodies are not intended to be strictly distinguished, and the thickness may also slightly deviate from the thickness range. In all cases, it is preferable that the average length in the principal plane (defined by (a+b)/2, using the maximum length a and the mini μm length b. The details will be described below) is larger than the thickness. Furthermore, the thickness range and classification described above are merely one criterion after all, and whether the magnetic body will include any of the flaky particle, thin band (ribbon), thin film, thick film, and plate-shaped member, will be considered comprehensively by including information such as external appearance and shape.

Figure 5C:
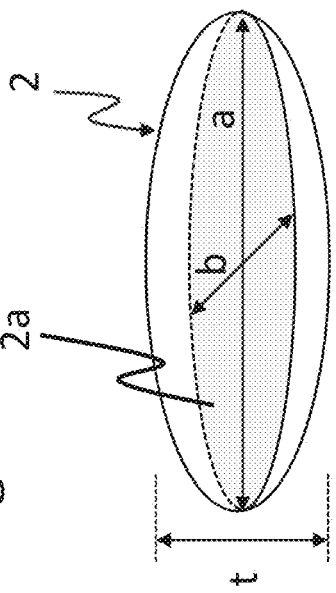
FIGS. 5A to 5D are schematic diagrams illustrating the principal plane of the magnetic body of the first embodiment.
Figure 5B:
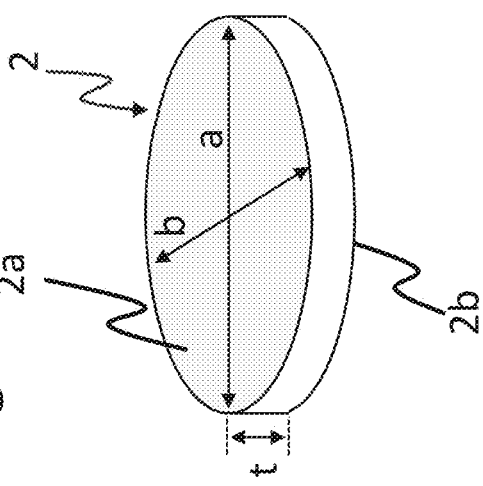
Figure 5A:
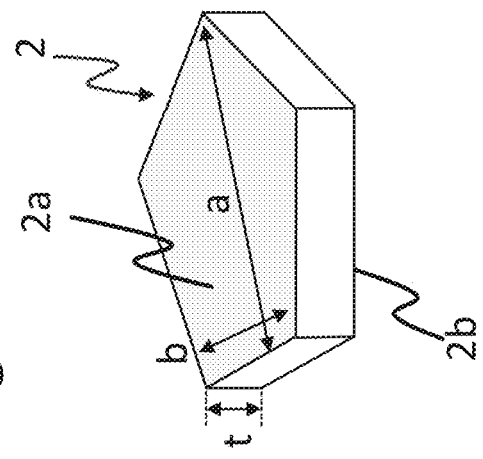
Figure 5D:
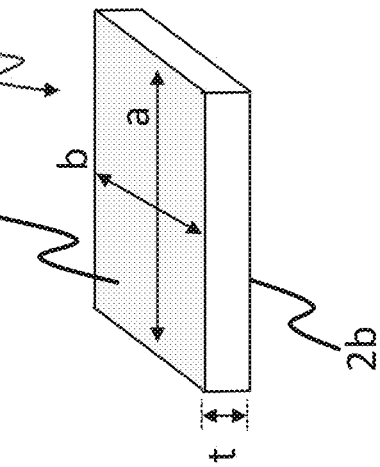

The "principal plane" in the magnetic body is a face corresponding to a plane in the planar structure. FIGS. 5A to 5D are schematic diagrams explaining the principal plane of the magnetic body of the present embodiment. For example, in the case of a polygonal column, a face having the largest area as shown in FIG. 5A, or a face facing the aforementioned face is the principal plane. In the case of a polygonal column, the first face 2a or the second face 2b is the principal plane. In the case of a circular column, the principal plane means the bottom face as shown in FIG. 5B. In the case of the circular column, the first face 2a or the second face 2b is the principal plane. In the case of a flaky ellipse, a cross-section having the largest area as shown in FIG. 5C is the principal plane. In the case of the flaky ellipse, the first face 2a is the principal plane. In the case of a rectangular parallelepiped, the principal plane means a face having the largest area as shown in FIG. 5D. In the case of the rectangular parallelepiped, the first face 2a or the second face 2b is the principal plane. That is, in the case of a flaky particle, the principal plane refers to a flat face; in the case of a thin band (ribbon) or a plate, the principal plane refers to a plate face; and in the case of a thin film or a thick film, the principal plane refers to a film face. In regard to the polygonal column of FIG. 5A, the circular column of FIG. 5B, and the flat ellipse of FIG. 5C, a face having the largest area is designated as first face 2a. Second face 2b refers to a face that faces the first face 2a. The principal plane is the first face 2a or the second face 2b.

Also, it is preferable that the average length in the principal plane is larger than the thickness. More preferably, it is preferable that the ratio of the average length in the principal plane with respect to the thickness is 5 or greater. Thereby, differences in the magnetic permeabilities of the magnetic wedge are likely to occur (anisotropy increases), and therefore, it is preferable. Even from the viewpoint of reducing losses, it is preferable because the eddy current loss can be reduced.

The average length in the principal face is defined by the formula: (a+b)/2, using the maximum length a and the minimum length b. The thickness t is defined as the length in a direction perpendicular to the principal plane. Furthermore, the ratio of the average length in the principal plane with respect to the thickness is defined by the formula: ((a+b)/2)/t, using the maximum length a, the minimum length b, and the thickness t.

From the viewpoint of suppressing the leakage flux, it is preferable that the magnetic bodies are disposed so as to be approximately perpendicular to the air-gap surface. There may be some of the magnetic bodies that are not perpendicular; however, it is the definition of the term "approximately perpendicular" according to the present embodiment that the principal planes of a half or more of the magnetic bodies fall in the range of ±20° with respect to a plane perpendicular to the air-gap surface, and it is preferable to satisfy the "approximately perpendicular" of this definition. More preferably, it is preferable that the principal planes of a half or more of the magnetic bodies fall in the range of ±10° with respect to a plane perpendicular to the air-gap surface.

FIG. 4A schematically illustrates the relation between the principal planes of magnetic bodies and the air-gap surface, in order to make this configuration more easily understandable. Furthermore, FIG. 4B explains the angle formed by a straight line perpendicular to the air-gap surface and the principal plane of a magnetic body included in the magnetic wedge.

FIG. 4A and FIG. 4B illustrate an example of using flaky particles as the magnetic bodies; however, it is also acceptable to use magnetic bodies of thin bands (ribbons), thin films, thick films, and plate-shaped members. When such a configuration is adopted, the magnetic permeabilities of the magnetic wedge become high in a direction perpendicular to the air-gap surface and become low in a direction parallel to the air-gap surface. Therefore, an increase in the leakage flux caused by the use of magnetic wedges is suppressed, and an effect of increasing the efficiency of the rotating electrical machine can be sufficiently enjoyed, which is preferable. Furthermore, the effective flux (main magnetic flux) can be increased, and the torque of the rotating electrical machine can be increased.

Figure 6:
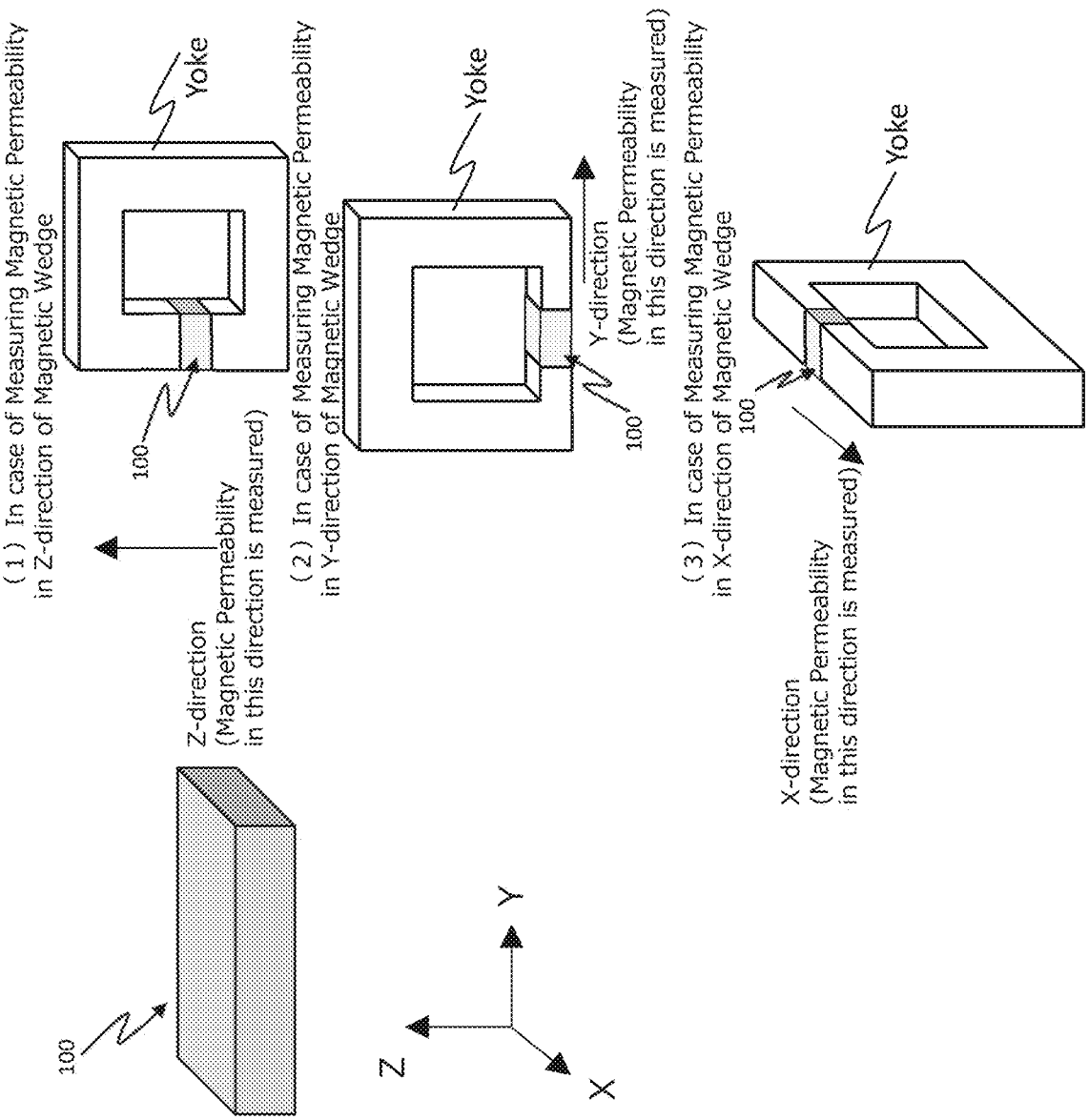
FIG. 6 is a schematic diagram illustrating a method for measuring the magnetic permeability of the first embodiment.

The magnetic permeability of the present embodiment is the intrinsic magnetic permeability that does not vary depending on the shape. That is, the magnetic permeability is the intrinsic magnetic permeability that is not affected by a diamagnetic field. An effective magnetic permeability changes because when the shape changes, the effect extent of a diamagnetic field changes. However, the intrinsic magnetic permeability is a magnetic permeability from which the influence of a diamagnetic field has been eliminated, and the intrinsic magnetic permeability can be determined by forming a perfectly closed magnetic circuit and measuring the magnetic permeability. For example, when a sample (magnetic wedge) is ring-shaped, the sample forms a perfectly closed magnetic circuit, and therefore, the intrinsic magnetic permeability is easily determined. Furthermore, even in a case in which the sample (magnetic wedge) is not ring-shaped, the intrinsic magnetic permeability can be determined when a closed magnetic circuit is formed using a yoke. FIG. 6 is a schematic diagram illustrating a method for measuring the magnetic permeability of the present embodiment. FIG. 6 illustrates a method for measuring the magnetic permeabilities in three directions. A closed magnetic circuit is formed in each of three directions by using a yoke, and thereby, the intrinsic magnetic permeabilities in each of the three directions can be determined. However, there may be occasions in which it is difficult to accurately measure the magnetic permeabilities in three directions, namely, the axial direction magnetic permeability $\mu z$, the rotational direction magnetic permeability $\mu\theta$, and the diametric direction magnetic permeability $\mu r$. In that case, the magnetic permeabilities may also be surmised by measuring the coercivity in the three directions. Generally, the coercivity and the magnetic permeability vary depending on the magnitude of magnetic anisotropy, and if the magnetic anisotropy is small, the coercivity also becomes low, while on the other hand, the magnetic permeability becomes high. In contrast, as the magnetic anisotropy becomes large, the coercivity also becomes high, while on the other hand, the magnetic permeability becomes low. Therefore, the coercivity and the magnetic permeability correlate with each other through an intermediary of the magnetic anisotropy, and the magnitude of the magnetic permeability can be surmised from the value of coercivity.

However, since there are occasions in which even though the coercivity is the same, the magnetic permeability is not the same, caution should be taken. For example, even with the same coercivity, in a case in which the shape of the magnetic bodies included in the magnetic wedge has a rod-like shape, the magnetic permeability becomes high in a direction parallel to the rod due to the effect of shape magnetic anisotropy, and the magnetic permeability becomes low in a direction perpendicular to the rod. Furthermore, even with the same coercivity, in a case in which the shape of the magnetic bodies included in the magnetic wedge has a flattened shape, the magnetic permeability becomes higher in a direction parallel to the flattened surface due to the effect of shape magnetic anisotropy, and the magnetic permeability becomes low in a direction perpendicular to the flattened surface. From these, in a case in which a relation between the magnitudes of the coercivity and the magnetic permeability is to be determined, it is also possible to comprehensively determine the relation of the magnitudes of magnetic permeabilities by initially surmising the magnetic permeability from the magnitude of coercivity, subsequently making an observation of the shape of the magnetic bodies included in the magnetic wedge, and surmising an effect of shape magnetic anisotropy from the shape of the magnetic bodies.

Figure 7:
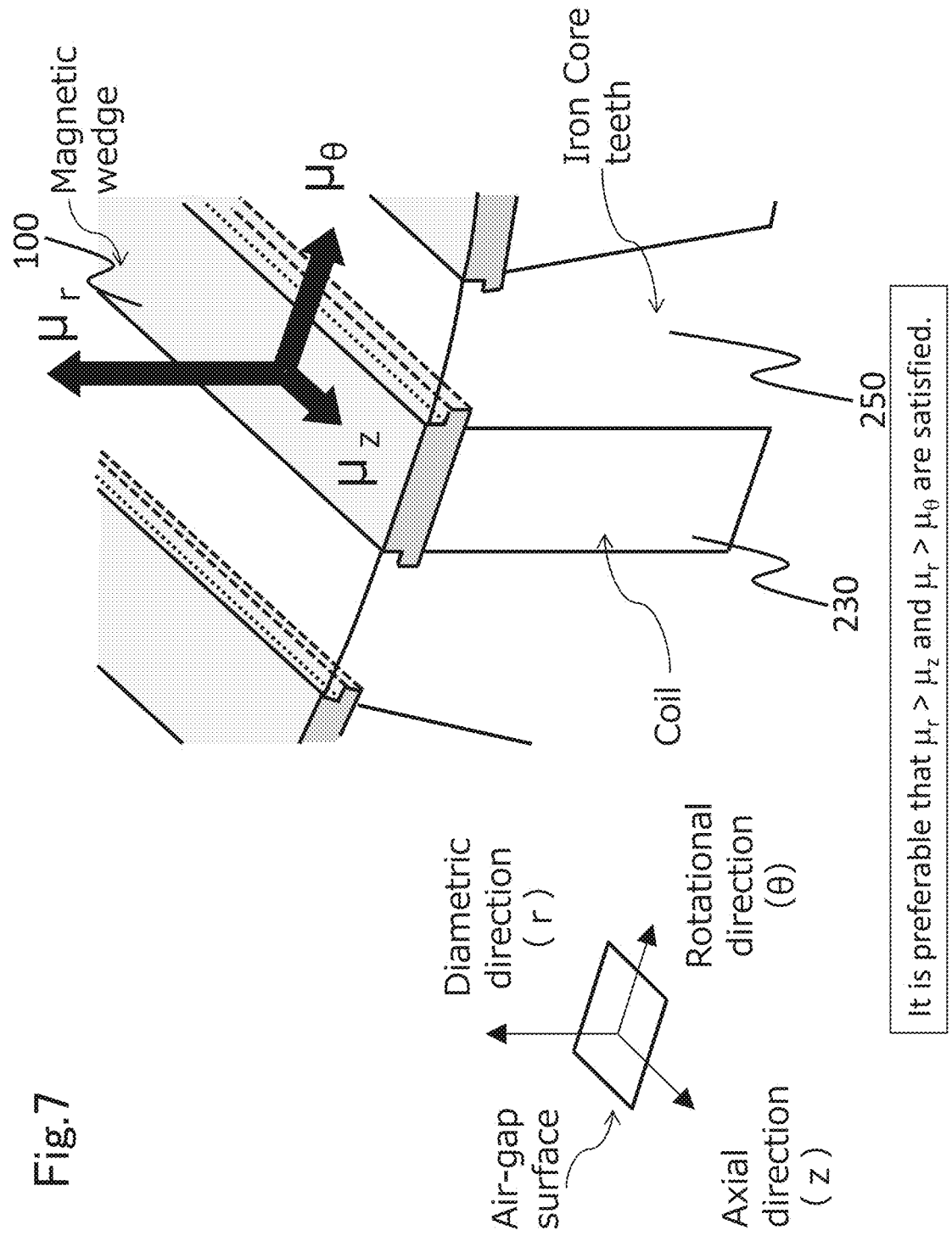
FIG. 7 is a schematic diagram illustrating the usage state of a magnetic wedge in the radial gap type rotating electrical machine of the first embodiment.

It is preferable that the magnetic bodies are disposed such that the diametric direction magnetic permeability $\mu r$ becomes higher than the rotational direction magnetic permeability $\mu\theta$ and the axial direction magnetic permeability $\mu z$. This is particularly preferable in the case of a radial gap type rotating electrical machine. This effect will be explained in detail using FIG. 7. FIG. 7 is a schematic diagram illustrating the usage state of a magnetic wedge in the radial gap type rotating electrical machine of the present embodiment. In a radial gap type rotating electrical machine, magnetic wedges are mounted so as to bridge between the iron core teeth disposed by leaving a predetermined distance in the direction of rotation, and block the slot openings that extend along the axial direction.

Therefore, from the viewpoint of reducing the leakage flux that flows between the iron core teeth via the magnetic wedges, it is preferable that the rotational direction magnetic permeability $\mu\theta$ is lower than the diametric direction magnetic permeability $\mu r$. Meanwhile, from the viewpoint of reducing the leakage flux that flows from the air-gap edge to the outer side of the axial direction iron core, it is preferable that the axial direction magnetic permeability $\mu z$ is lower than the diametric direction magnetic permeability $\mu r$.

In conclusion, when the magnetic bodies are disposed such that the diametric direction magnetic permeability $\mu r$ becomes higher than the rotational direction magnetic permeability $\mu\theta$ and the axial direction magnetic permeability $\mu z$, an increase in the leakage flux can be suppressed to a minimum level, which is preferable. Thereby, an effect of increasing the efficiency of the rotating electrical machine by using the magnetic wedge can be sufficiently enjoyed. More preferably, it is preferable that the magnetic permeability increases in the order of the diametric direction, the rotational direction, and the axial direction (diametric direction magnetic permeability $\mu r$ 22 rotational direction magnetic permeability $\mu\theta$ > axial direction magnetic permeability $\mu z$). When the rotational direction magnetic permeability $\mu\theta$ is higher than the axial direction magnetic permeability $\mu z$, it is preferable because the magnetic flux that passes from the iron core teeth to the air-gap side via the wedges increases, and the harmonic loss can be reduced. That is, the efficiency of the rotating electrical machine can be further increased by using magnetic wedges.

In FIG. 7, magnetic wedges fill the entire space between the coil and the iron core surface in the iron core slot; however, it is not necessarily essential that the entire space is filled. The space occupied by magnetic wedges may be only a portion between the coil and the iron core surface.

FIG. 7 shows a magnetic wedge 100, a coil 230, and an iron core tooth 250.

Figure 8:
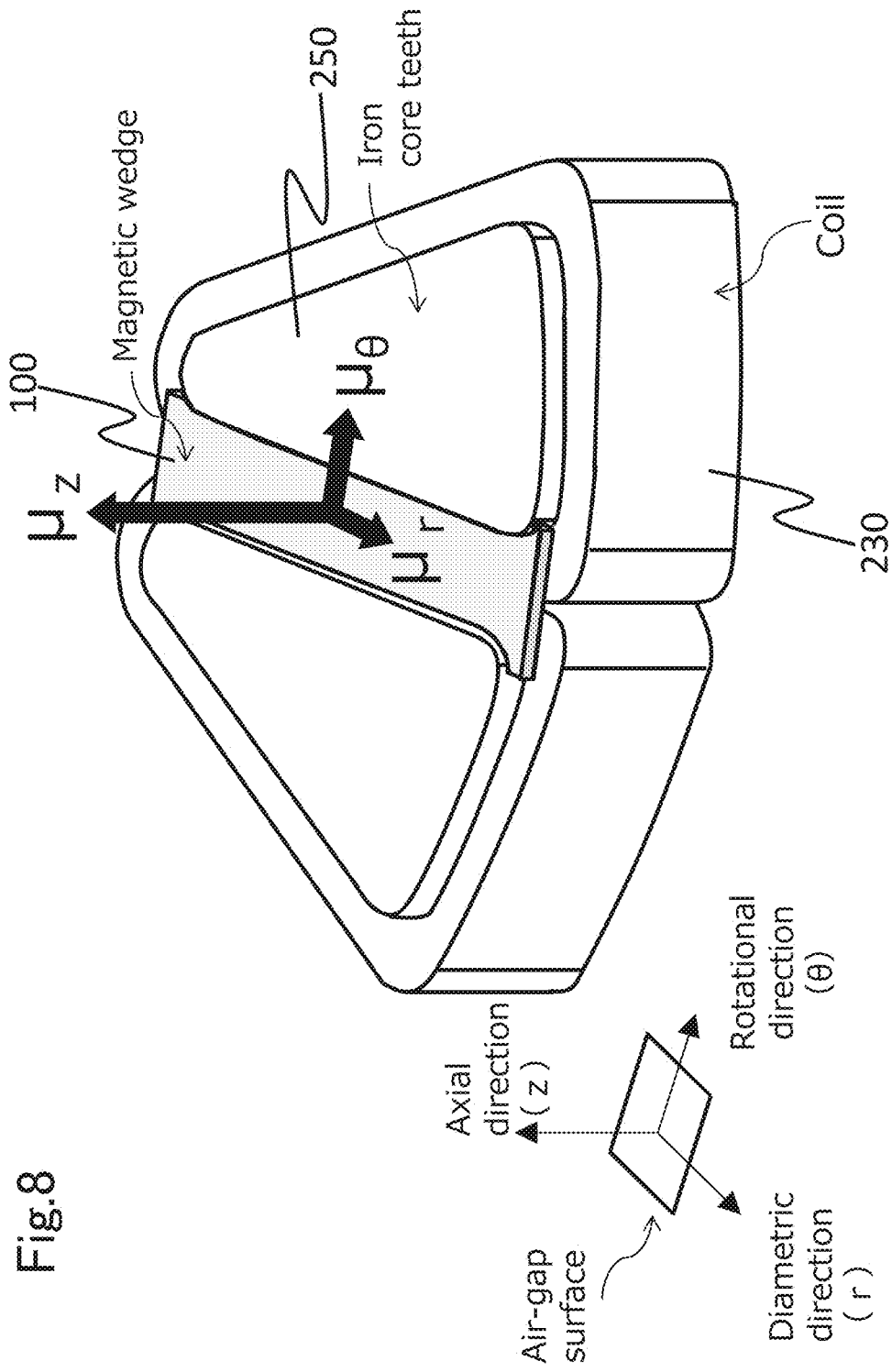
FIG. 8 is a schematic diagram illustrating the usage state of a magnetic wedge in the axial gap type rotating electrical machine of the first embodiment.

It is preferable that the magnetic bodies are disposed such that the axial direction magnetic permeability $\mu z$ becomes higher than the rotational direction magnetic permeability $\mu\theta$ and the diametric direction magnetic permeability $\mu r$. This is particularly preferable in the case of an axial gap type rotating electrical machine. This effect will be explained in detail using FIG. 8. FIG. 8 is a schematic diagram illustrating the usage state of magnetic wedges in an axial gap type rotating electrical machine. In an axial gap type rotating electrical machine, magnetic wedges are mounted so as to bridge between the iron core teeth that are disposed by leaving a predetermined distance in the rotational direction, and block the slot openings that extend along the diametric direction.

FIG. 8 shows a magnetic wedge 100, a coil 230, and an iron core tooth 250.

Accordingly, from the viewpoint of reducing the leakage flux that flows between iron core teeth via magnetic wedges, it is preferable that the rotational direction magnetic permeability $\mu\theta$ is lower than the axial direction magnetic permeability $\mu z$. Meanwhile, from the viewpoint of reducing the leakage flux that flows from the air-gap edge to the outer side of the iron core in the diametric direction, it is preferable that the diametric direction magnetic permeability $\mu r$ is lower than the axial direction magnetic permeability $\mu z$.

In conclusion, when the magnetic bodies are disposed such that the axial direction magnetic permeability $\mu z$ becomes higher than the rotational direction magnetic permeability $\mu\theta$ and the diametric direction magnetic permeability $\mu r$, an increase in the leakage flux can be suppressed to a minimum level, which is preferable. Thereby, an effect of increasing the efficiency of the rotating electrical machine can be sufficiently enjoyed by using magnetic wedges. More preferably, it is preferable that the magnetic permeability increases in the order of the axial direction, the rotational direction, and the diametric direction (axial direction magnetic permeability $\mu z>$ rotational direction magnetic permeability $\mu\theta>$ diametric direction magnetic permeability $\mu r$). When the rotational direction magnetic permeability $\mu\theta$ is higher than the diametric direction magnetic permeability $\mu r$, it is preferable because the magnetic flux that passes from the iron core teeth to the air-gap side via the wedges increases, and the harmonic loss can be reduced. That is, the efficiency of the rotating electrical machine can be further increased by using magnetic wedges.

Figure 9:
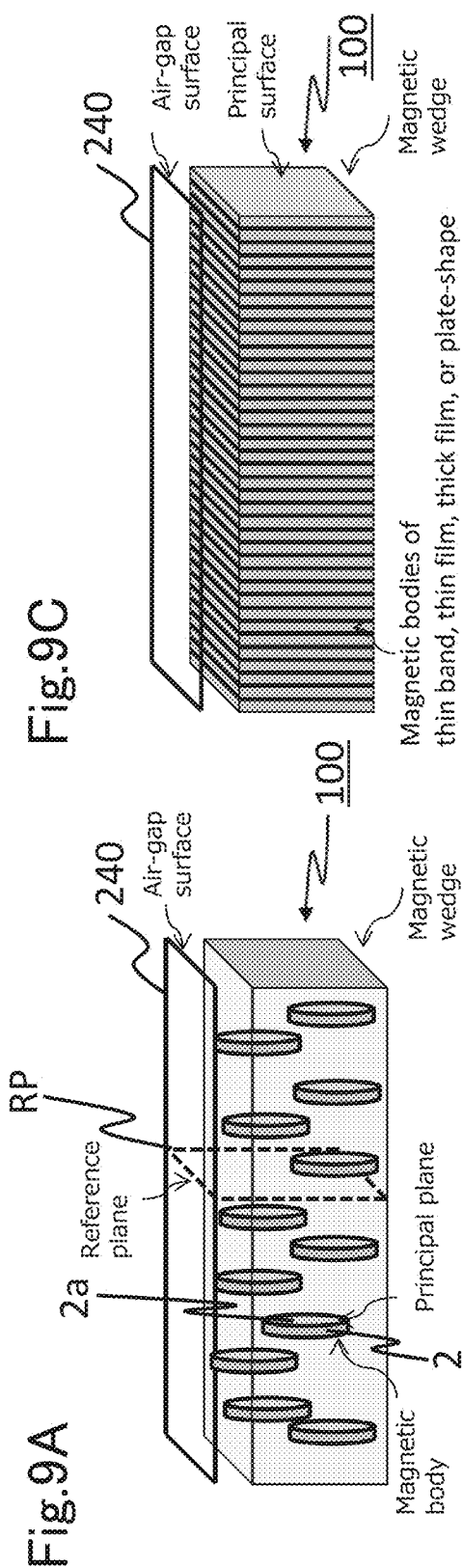
FIGS. 9A to 9C are schematic diagrams illustrating a magnetic wedge formed by aligning the magnetic bodies of the first embodiment.

FIGS. 9A to 9C are schematic diagrams of a magnetic wedge formed by orienting the magnetic bodies of the present embodiment. It is preferable that the magnetic bodies are disposed in an oriented manner. According to the present invention, the term "oriented" means a state in which the principal planes of the magnetic bodies are aligned in a particular direction. It is preferable that the average value of the angles formed by the principal planes of the magnetic bodies included in a magnetic wedge and a reference plane falls in the range of ±20°. FIG. 9A schematically illustrates this configuration in order to make the configuration more easily understandable. In FIG. 9A, the magnetic bodies included in the magnetic wedge are arranged such that the normal lines of the principal planes of all the magnetic bodies coincide in a particular direction. Furthermore, FIG. 9B explains the angle formed by the principal plane of a magnetic body included in the magnetic wedge and a reference plane. In regard to the method for determining the reference plane, ten or more magnetic bodies included in a magnetic wedge are observed by scanning electron microscopy (SEM) or the like, magnetic bodies that satisfy the condition of being approximately perpendicular to the air-gap surface are selected, and a plane that is average with regard to the principal planes of the magnetic bodies thus selected is designated as a reference plane. Meanwhile, in regard to the method for determining the reference plane, the measurer may arbitrarily determine the reference plane as long as the reference plane is a plane perpendicular to the air-gap surface. In this case, the measurer makes a judgment by determining the angle formed by an arbitrarily determined reference plane and the principal plane, and determining whether the extent of variation falls in the range of ±20°. The magnetic body on the left-hand side of FIG. 9B shows an example of the case in which the angle formed by the principal plane and the reference plane is 0°, that is, the case in which the principal plane coincides with the reference plane. On the other hand, the magnetic body on the right-hand side shows an example of the case in which the angle formed by the principal plane and the reference plane is 20°. When such a configuration is adopted, differences in the magnetic permeabilities of the magnetic wedge are likely to occur (anisotropy increases), and therefore, it is preferable. Furthermore, as illustrated in FIG. 9C, the magnetic wedge may also be configured by using not flaky particles, but magnetic bodies such as thin bands (ribbons), thin films, thick films, or plate-shaped members.

FIG. 9A to FIG. 9C show a magnetic wedge 100, a magnetic body 2, a principal plane (first face) 2a, a reference plane RP, and an air-gap surface 240.

Figure 10:
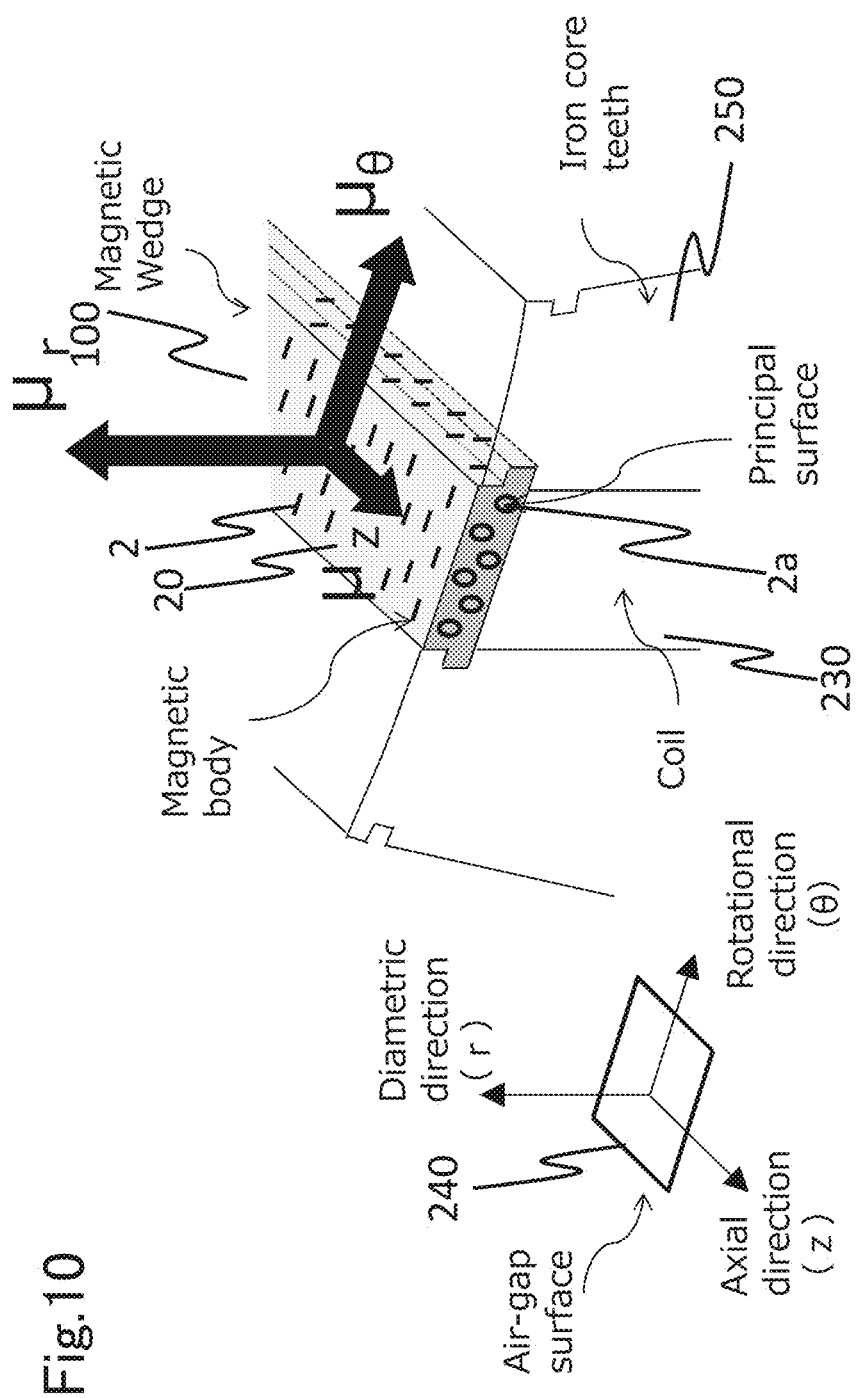
FIG. 10 is a schematic diagram for explaining the state of disposition of the magnetic bodies of the first embodiment, which is suitable for reducing the leakage flux flowing from the air-gap edge to the outside of the iron core.

FIG. 10 is a schematic diagram for explaining the disposition state of the magnetic bodies of the present embodiment suitable for reducing the leakage flux that flows from the air-gap edge to the outer side of the iron core. There are occasions in which it is preferable that the principal planes of the magnetic bodies are disposed in an oriented manner along the rotational direction. This is preferable for both the case of a radial gap type rotating electrical machine and the case of an axial gap type rotating electrical machine. FIG. 10 schematically illustrates the disposition state of the magnetic bodies by taking the case of a radial gap type rotating electrical machine as an example, in order to make this configuration more easily understandable. When such a configuration is adopted, the leakage flux that flows from the air-gap edge to the outer side of the iron core can be reduced to a large extent. Thereby, an effect of increasing the efficiency of the rotating electrical machine can be sufficiently enjoyed by using magnetic wedges.

FIG. 10 shows a magnetic wedge 100, magnetic bodies 2, a principal plane (first face) 2a, a coil 230, an air-gap surface 240, and an iron core tooth 250.

Figure 11:
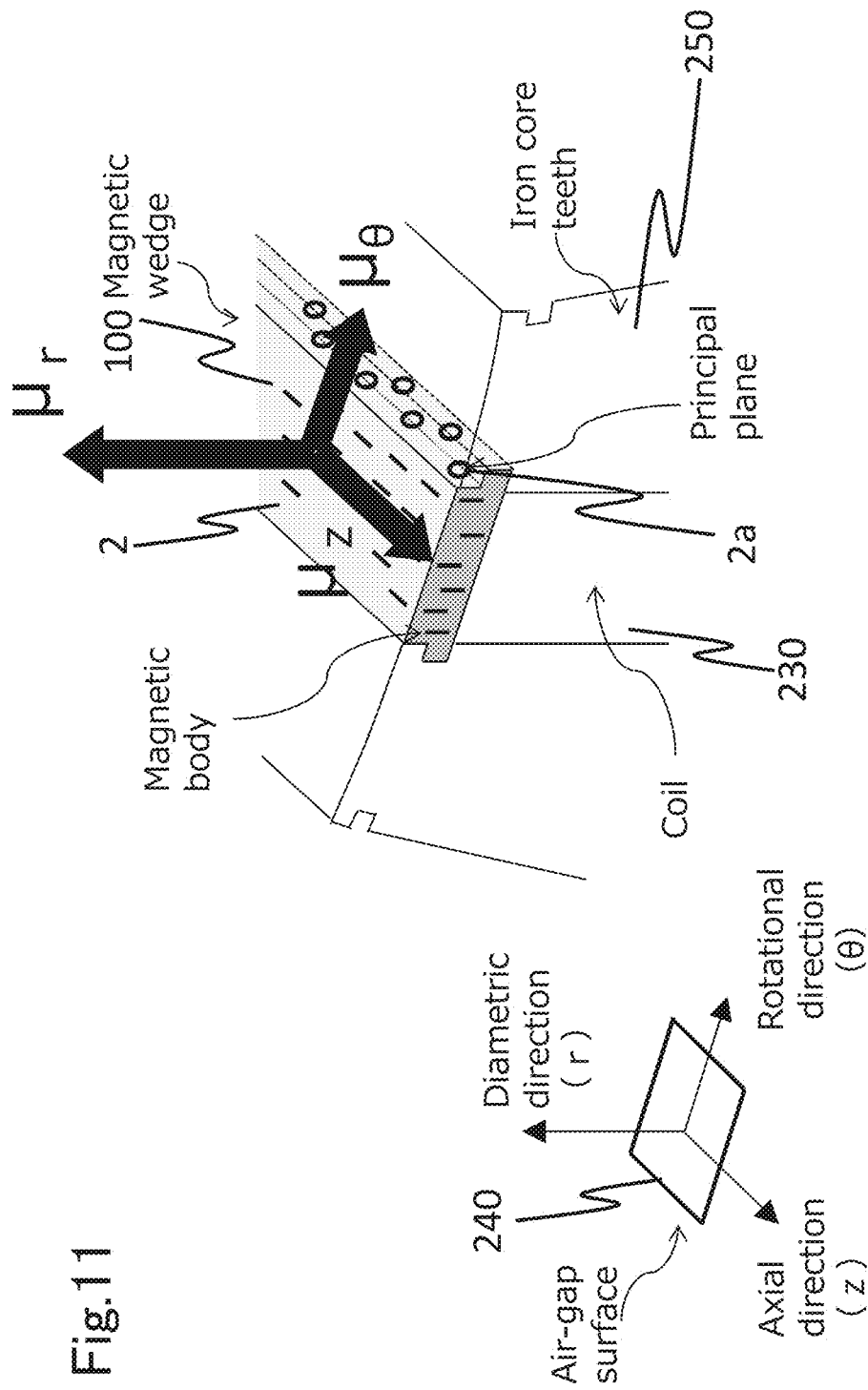
FIG. 11 is a schematic diagram for explaining the state of disposition of magnetic bodies suitable for reducing the leakage flux that flows through iron core teeth via a magnetic wedge of the first embodiment.

FIG. 11 is a schematic diagram for explaining the disposition state of magnetic bodies suitable for reducing the leakage flux that flows through iron core teeth via the magnetic wedge of the present embodiment. It is preferable that the principal planes of the magnetic bodies are disposed in an oriented manner so as to be approximately perpendicular to the rotational direction. This is preferable for both the case of a radial gap type rotating electrical machine and the case of an axial gap type rotating electrical machine. FIG. 11 schematically illustrates the disposition state of the magnetic bodies by taking the case of a radial gap type rotating electrical machine as an example, in order to make this configuration more easily understandable. When such a configuration is adopted, the leakage flux that flows between iron core teeth via magnetic wedges can be reduced to a large extent. Thereby, an effect of increasing the efficiency of the rotating electrical machine can be sufficiently enjoyed by using magnetic wedges.

FIG. 11 shows a magnetic wedge 100, magnetic bodies 2, a principal plane (first face) 2a, a coil 230, an air-gap surface 240, and an iron core tooth 250.

It is preferable that the magnetic bodies have differences in the magnetic permeabilities depending on the direction in the principal plane. More preferably, it is preferable that the directions in which the magnetic permeabilities of the magnetic bodies will become the highest (direction of the axis of easy magnetization), align unidirectionally. When such a configuration is adopted, differences in the magnetic permeabilities of the magnetic wedge are likely to occur (anisotropy increases), and therefore, it is preferable. More preferably, it is preferable that the directions of the axes of easy magnetization of the magnetic bodies align in a direction perpendicular to the air-gap surface. That is, in the case of a radial gap type rotating electrical machine, it is preferable that the directions of the axes of easy magnetization of the magnetic bodies align in the diametric direction, and in the case of an axial gap type rotating electrical machine, it is preferable that the directions of the axes of easy magnetization of the magnetic bodies align in the axial direction. When such a configuration is adopted, the magnetic permeabilities of the magnetic wedge are likely to have an anisotropy that is high in a direction perpendicular to the air-gap surface and is low in a direction parallel to the air-gap surface. Thereby, an increase in the leakage flux caused by the use of magnetic wedges can be suppressed, and an effect of increasing the efficiency of the rotating electrical machine can be sufficiently enjoyed. Therefore, it is preferable. Furthermore, the effective flux (main magnetic flux) can be increased, and the torque of the rotating electrical machine can be increased.

Figure 12:
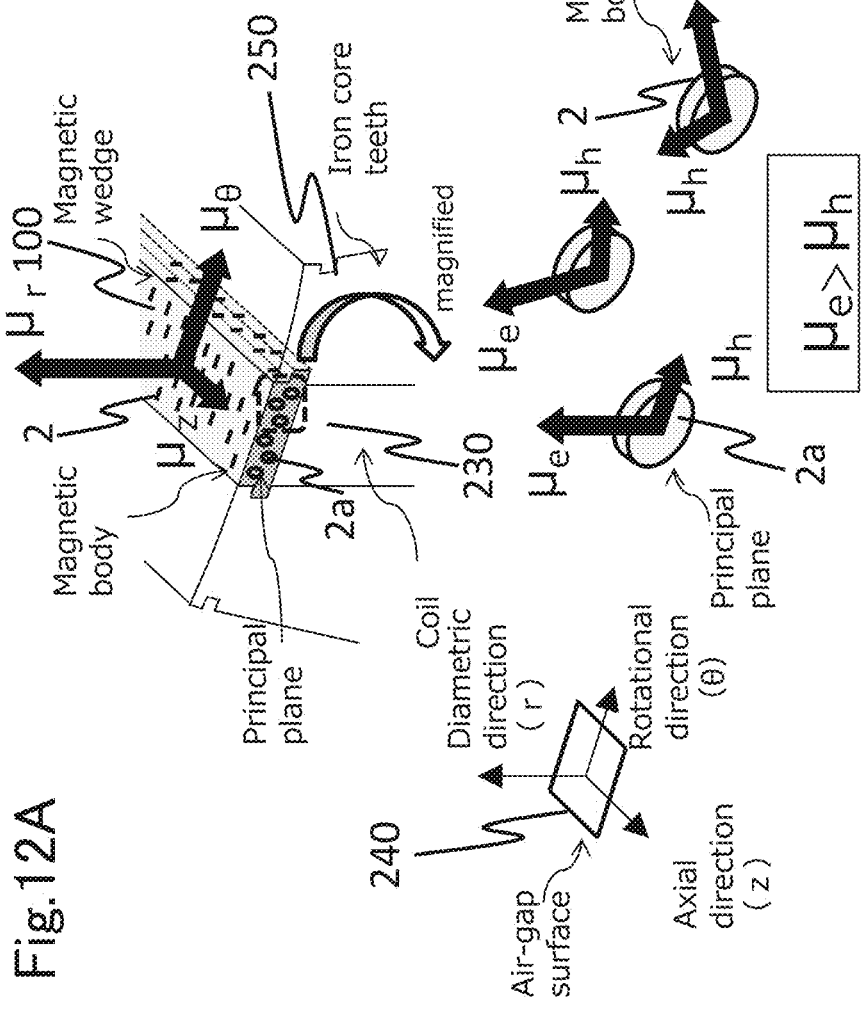
FIGS. 12A and 12B are an exemplary conceptual diagram of a magnetic wedge of the first embodiment, the magnetic wedge containing magnetic bodies, each magnetic body having differences in the magnetic permeabilities depending on the in-plane direction.

FIGS. 12A and 12B are an exemplary conceptual diagrams of a magnetic wedge of the present embodiment, the magnetic wedge including magnetic bodies that have differences in the magnetic permeabilities depending on the in-plane direction. FIG. 12A and FIG. 12B are diagrams explaining the concept of the magnetic wedge including magnetic bodies that have differences in the magnetic permeabilities depending on the directions in the principal plane, by taking the case of a radial gap type rotating electrical machine as an example. In the same diagrams, the direction of the axis of easy magnetization of the magnetic body is indicated with an arrow of $\mu e$, and a direction perpendicular to the direction of easy magnetization of the magnetic body (that is, direction of the axis of hard magnetization of the magnetic body) is indicated with an arrow of $\mu h$. FIG. 12A shows the state in which the directions of the axes of easy magnetization of individual magnetic bodies are not aligned ($\mu e > \mu h$ establishes; however, the directions of $\mu e$ are not aligned), and FIG. 12B shows the state in which the directions of the axes of easy magnetization of individual magnetic bodies are aligned in a direction perpendicular to the air-gap surface ($\mu e > \mu h$, the directions of $\mu e$ are aligned, and their direction is a direction perpendicular to the air-gap surface).

FIG. 12A and FIG. 12B show a magnetic wedge 100, magnetic bodies, 2, a principal plane (first face) 2a, a coil 230, an air-gap surface 240, and iron core teeth 250.

It is preferable that the magnetic bodies include at least one selected from the group consisting of a flaky particle, a thin band (ribbon), a thin film, a thick film, and a plate-shaped member. When such a configuration is adopted, production is made easier, the production yield increases, and the production cost can be reduced. It is particularly preferable that the magnetic bodies are thin bands (ribbons) or plate-shaped members. This is because production is made easier, the production yield increases, and the production cost can be especially reduced.

It is particularly preferable that the magnetic bodies are flaky particles. When such a configuration is adopted, the eddy current loss occurring in the magnetic edge can be reduced. Thereby, an effect of increasing the efficiency of the rotating electrical machine can be sufficiently enjoyed by using magnetic wedges. Furthermore, in the case of producing a magnetic wedge having a complicated shape, since the only thing needed is to consolidate a powder, production is made easier, the production yield increases, and the production cost can be reduced.

It is preferable that the magnetic bodies contain at least one magnetic element selected from the group consisting of iron (Fe), cobalt (Co), and nickel (Ni) and has a thickness of from 10 nm to 100 µm, and that the ratio of the average length in the principal plane with respect to the thickness is from 5 to 10,000. In a case in which the magnetic bodies are flaky particles, the magnetic bodies are flaky particles (flattened particles) having a flaky (flattened) shape (flaky shape or flattened shape).

Figure 13:
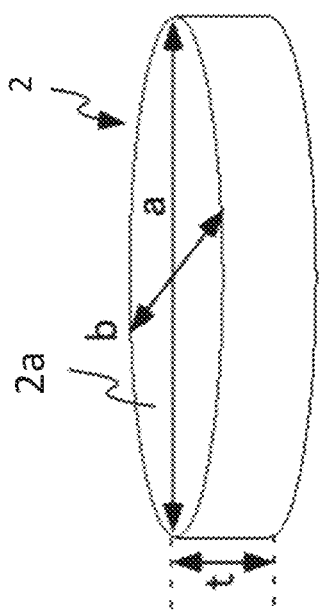
FIG. 13 is a schematic diagram of an example of the magnetic body of the first embodiment.

FIG. 13 is a schematic diagram of an example of the magnetic body of the present embodiment.

FIG. 13 shows a magnetic body 2 and a principal plane 2a. The same diagram shows a flaky particle as an example; however, the magnetic body may also be a thin band (ribbon), a thin film, a thick film, or a plate-shaped member.

It is preferable that the magnetic body contains Fe and Co, and that the amount of Co is from 10 at % to 60 at %, and more preferably from 10 at % to 40 at %, with respect to the total amount of Fe and Co. It is preferable because adequately significant magnetic anisotropy is imparted thereby. Furthermore, it is preferable because a Fe—Co system can easily realize high saturation magnetization. Also, when the composition range of Fe and Co falls in the range described above, even higher saturation magnetization can be realized, which is preferable.

It is preferable that the magnetic body contains at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements. Thereby, thermal stability or oxidation resistance of the magnetic body can be enhanced. Among them, Al and Si are particularly preferred because these elements can easily form solid solutions with Fe, Co, and Ni, which are main components of the magnetic body, and can contribute to an enhancement of thermal stability and oxidation resistance.

The thickness of the magnetic body, and the ratio of the average length in the principal plane with respect to the thickness can be determined by making an observation of the magnetic body by transmission electron microscopy (TEM) or scanning electron microscopy (SEM), and a value obtained by averaging 10 or more values is employed.

The thickness of the magnetic body is preferably from 10 nm to 100 µm, and more preferably from 1 µm to 100 µm. The ratio of the average length in the principal plane with respect to the thickness is preferably from 5 to 10,000, and more preferably from 10 to 1,000. In a case in which a plurality of magnetic bodies are incorporated into a magnetic wedge, it is preferable that the thickness and the ratio of the average length in the principal plane with respect to the thickness are determined for individual magnetic bodies, and the average values of the thickness and the ratio fall in the ranges described above. When the thickness is small, and the ratio of the average length in the principal plane with respect to the thickness is large, it is preferable from the viewpoint that the eddy current loss is likely to be reduced; however, on the other hand, the coercivity tends to slightly increase. Therefore, from the viewpoint of reducing the coercivity, it is preferable that the magnetic body has an appropriate thickness and an appropriate ratio of the average length in the principal plane with respect to the thickness. In regard to the thickness and the ratio of the average length in the principal plane with respect to the thickness in the ranges described above, the magnetic body becomes a well-balanced material in view of the eddy current loss and low coercivity (low hysteresis loss is made possible).

In order to induce magnetic anisotropy, there is a method of amorphizing the crystallinity of the magnetic body as far as possible, and thereby inducing magnetic anisotropy in one direction in the plane by means of a magnetic field or strain (producing differences in the magnetic permeabilities). In this case, it is desirable that the magnetic body is formed to have a composition that can be amorphized as easily as possible. From this point of view, it is preferable that the magnetic body contains at least one additive element selected from the group consisting of boron (B), silicon (Si), aluminum (Al), carbon (C), titanium (Ti), zirconium (Zr), hafnium (Hf), niobium (Nb), tantalum (Ta), molybdenum (Mo), chromium (Cr), copper (Cu), tungsten (W), phosphorus (P), nitrogen (N), gallium (Ga), and yttrium (Y). Thereby, amorphization proceeds, it becomes easy to impart magnetic anisotropy, and the differences in coercivity in the principal plane become large. Therefore, it is preferable. An additive element having a large difference in the atomic radius of a first element, which is at least one selected from the group consisting of Fe, Co, and Ni, is preferred. Furthermore, an additive element whose enthalpy of mixing between the first element, which is at least one selected from the group consisting of Fe, Co, and Ni, and the additive element negatively increases, is preferred. A multicomponent system that includes the first element and the additive element and is composed of three or more kinds of elements in total, is preferred. Furthermore, since semi-metallic additive elements such as B and Si have slow rates of crystallization and are easily amorphized, it is advantageous when those additive elements are mixed into the system. From the viewpoint such as described above, B, Si, P, Ti, Zr, Hf, Nb, Y, Cu, and the like are preferred, and above all, it is more preferable that the additive elements include any one of B, Si, Zr, and Y. Furthermore, it is preferable that the total amount of the additive elements is altogether from 0.001 at % to 80 at % with respect to the total amount of the first element and the additive elements. More preferably, the total amount is from 5 at % to 80 at %, and even more preferably from 10 at % to 40 at %. As the total amount of the additive elements is larger, amorphization proceeds, and it becomes easier to impart magnetic anisotropy, which is preferable (that is, it is preferable from the viewpoints of low losses and high magnetic permeability). However, on the other hand, since the proportion of the magnetic metal phase becomes small, it is not preferable from the viewpoint that saturation magnetization is decreased, and it is important to select the composition and the amounts of additive elements according to the purpose.

The crystal grain size of the magnetic body (crystal grain size of the main phase containing the magnetic metals described above) is preferably 10 nm or less. The crystal grain size is more preferably 5 nm or less, and even more preferably 2 nm or less. The crystal grain size can be determined simply by an XRD analysis. That is, in regard to the maximum intensity peak among the peaks attributed to the magnetic metal phase in XRD, the maximum intensity peak can be determined by Scherrer's formula from the diffraction angle and the half-value width. Scherrer's formula is represented by $D=0.9\lambda/(\beta \cos \theta)$, wherein D represents the crystal grain size; $\lambda$ represents the X-ray wavelength of measurement; $\beta$ represents the half-value width; and $\theta$ represents Bragg's angle of diffraction. Furthermore, the crystal grain size can also be determined by making an observation of a large number of magnetic metal phases using a TEM (transmission electron microscope), and averaging the particle sizes. When the crystal grain size is small, it is preferable to determine the crystal grain size by an XRD analysis, and when the crystal grain size is large, it is preferable to determine the crystal grain size by a TEM observation; however, it is preferable to select the measurement method according to the circumstances, or to make a decision comprehensively by using both the methods in combination. The crystal grain size of the magnetic metal phase that can be determined by an XRD analysis or a TEM observation is preferably 10 nm or less, more preferably 5 nm or less, and even more preferably 2 nm or less. Thereby, for example, magnetic anisotropy can be easily imparted by applying a heat treatment in a magnetic field, and the differences in coercivity in the principal plane become large. Thus, it is preferable. Furthermore, since a small crystal grain size means that the magnetic body is becoming close to amorphousness, electrical resistance becomes higher as compared to a highly crystalline material, and thereby the eddy current loss can be easily reduced. Thus, it is preferable. Furthermore, it is preferable because the magnetic body has excellent corrosion resistance and oxidation resistance compared to highly crystalline materials.

It is preferable that the magnetic body contains Fe and Co and has a part having the crystal structure of the body-centered cubic (bcc) structure. Thereby, it is preferable because adequately significant magnetic anisotropy is likely to be imparted, and the magnetic characteristics described above are enhanced. Furthermore, even if the magnetic body has a "crystal structure of a mixed phase of bcc and fcc", which partially has the crystal structure of the face-centered cubic (fcc) structure, it is preferable because adequately significant magnetic anisotropy is likely to be imparted, and the magnetic characteristics described above are enhanced.

It is preferable that the principal planes are crystallographically oriented. The direction of orientation is preferably the (110) plane orientation or the (111) plane orientation; however, the direction of orientation is more preferably the (110) plane orientation. When the crystal structure of the magnetic body is the body-centered cubic structure (bcc), the (110) plane orientation is preferred, and when the crystal structure of the magnetic body is the face-centered cubic structure (fcc), the (111) plane orientation is preferred. Thereby, adequately significant magnetic anisotropy is likely to be imparted, and the magnetic characteristics described above are enhanced. Therefore, it is preferable.

Regarding a more preferred direction of orientation, the (110) [111] direction and the (111) [110] direction are preferred; however, the direction of orientation is more preferably the (110) [111] direction. When the crystal structure of the magnetic body is the body-centered cubic structure (bcc), orientation in the (110) [111] direction is preferred, and when the crystal structure of the magnetic body is the face-centered cubic structure (fcc), orientation in the (111) [110] direction is preferred. Thereby, adequately significant magnetic anisotropy is likely to be imparted, and the magnetic characteristics described above are enhanced. Therefore, it is preferable. According to the present specification, the term "(110) [111] direction" means that the slip plane is the (110) plane or a plane crystallographically equivalent thereto, that is, the {110} plane, and the slip direction is the [111] direction or a direction crystallographically equivalent thereto, that is, the <111> direction. The same also applies to the (111) [110] direction. That is, the (111) [110] direction means that the slip plane is the (111) plane or a plane crystallographically equivalent thereto, that is, the {111} plane, and the slip direction is the [110] direction or a direction crystallographically equivalent thereto, that is, the <110> direction.

The lattice strain of the magnetic body (lattice strain of the main phase containing the magnetic metals described above) is preferably adjusted to a value of from 0.01% to 10%, more preferably from 0.01% to 5%, even more preferably from 0.01% to 1%, and still more preferably from 0.01% to 0.5%. Thereby, adequately significant magnetic anisotropy is likely to be imparted (differences in the magnetic permeabilities are likely to occur), and the magnetic characteristics are enhanced. Therefore, it is preferable.

The lattice strain can be calculated by analyzing the line width obtainable by X-ray diffraction (XRD) in detail. That is, the contributions of the line width broadening can be separated into the crystal grain size and the lattice strain by implementing the Halder-Wagner plot and the Hall-Williamson plot. Thereby, the lattice strain can be calculated. The Halder-Wagner plot is preferred from the viewpoint of reliability. In regard to the Halder-Wagner plot, for example, N. C. Halder, C. N. J. Wagner, Acta Cryst. 20 (1966) 312-313, and the like may be referred to. Here, the Halder-Wagner plot is represented by the following formula.

$$\frac{\beta^2}{\tan^2\theta} = \frac{K\lambda}{D}\frac{\beta}{\tan\theta\sin\theta} + 16\varepsilon^2, \varepsilon = \varepsilon_{max} = \frac{\sqrt{2\pi}}{2}\sqrt{\overline{\varepsilon^2}} \qquad \text{[Math. 1]}$$

($\beta$: width of integration, $K$: constant, $\lambda$: wavelength, $D$: crystal grain size, $\sqrt{\overline{\varepsilon^2}}$: crystal strain (root mean square))

That is, plotting is performed by taking $\beta^2/\tan^2\theta$ on the axis of ordinates and $\beta/\tan\theta\sin\theta$ on the axis of abscissas, the crystal grain size D is calculated from the gradient of an approximation straight line of the plot, and the lattice strain $\varepsilon$ is calculated from the ordinate intercept. When the lattice strain obtained by the Halder-Wagner plot of the above-described formula (lattice strain (root mean square)) is from 0.01% to 10%, more preferably from 0.01% to 5%, even more preferably from 0.01% to 1%, and still more preferably from 0.01% to 0.5%, it is preferable because adequately significant magnetic anisotropy is likely to be imparted, and the magnetic characteristics described above are enhanced.

The lattice strain analysis as described above is an effective technique in a case in which a plurality of peaks can be detected in XRD; however, on the other hand, in a case in which the peak intensities in XRD are weak and there are fewer peaks that can be detected (for example, in a case in which only one peak is detected), the analysis is difficult. In such a case, it is preferable to calculate the lattice strain by the following procedure. First, the composition is determined by inductively coupled plasma (ICP) emission spectrometry, energy dispersive X-ray spectrometry (EDX), or the like, and the composition ratio of three magnetic metal elements, namely, Fe, Co, and Ni, is calculated (in a case in which there are only two magnetic metal elements, the composition ratio of the two elements. In a case in which there is only one magnetic metal element, the composition of the one element (=100%)). Next, the ideal lattice spacing do is calculated from the composition of Fe—Co—Ni (see the literature values and the like. Depending on cases, an alloy having the composition is produced, and the lattice spacing is calculated by measurement). Subsequently, the amount of strain can be determined by determining the difference between the lattice spacing d of the peaks of a sample thus measured and the ideal lattice spacing do. That is, in this case, the amount of strain is calculated as $(d-d_0)/d_0 \times 100(\%)$. Thus, in regard to the analysis of lattice strain, it is preferable to perform the evaluation by using the two above-mentioned techniques as appropriate according to the state of peak intensity, and depending on cases, by using both of the techniques in combination.

It is preferable that either crystallites of the magnetic body are unidirectionally linked together in a bead-like form in the principal plane, or the crystallites have a rod shape and are oriented unidirectionally in the principal plane. Thereby, adequately significant magnetic anisotropy is likely to be imparted, and the magnetic characteristics described above are enhanced. Therefore, it is preferable.

Figure 14:
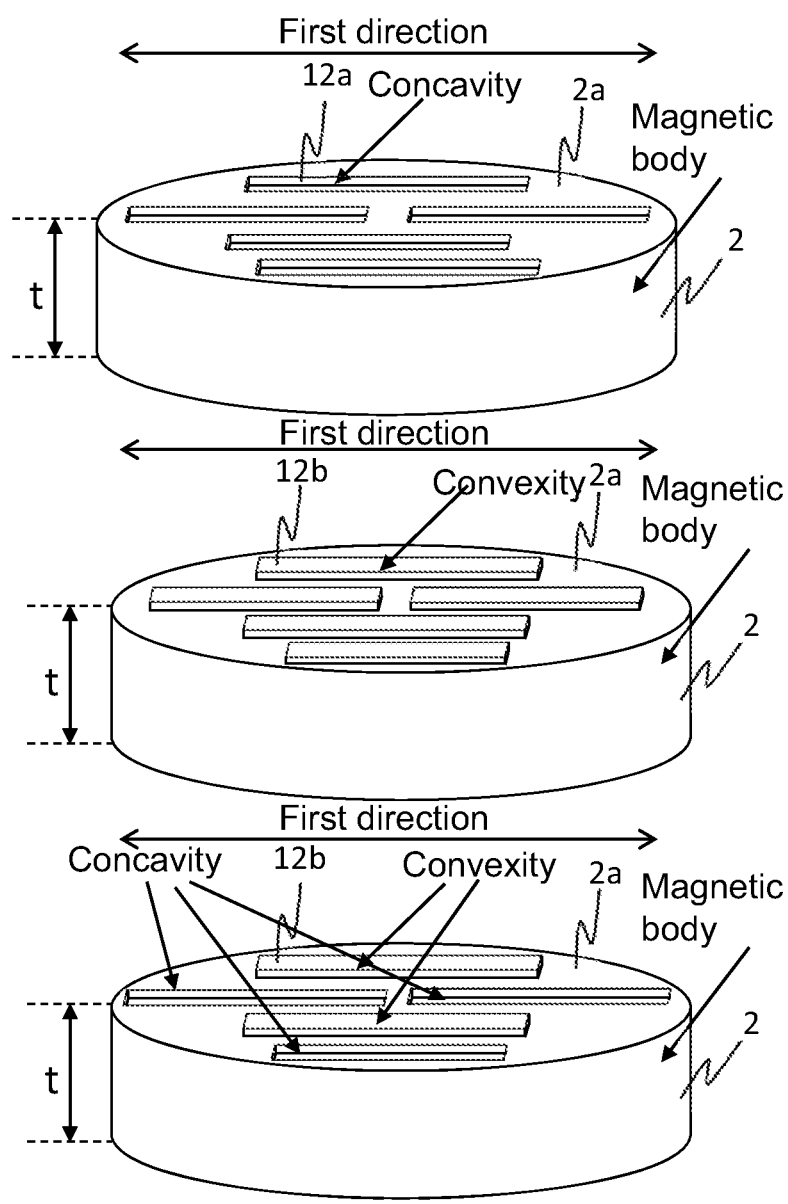
FIG. 14 is a schematic diagram illustrating an example of the magnetic body having concavities or convexities of the magnetic body of the first embodiment.

FIG. 14 is a schematic diagram illustrating an example of a magnetic body having concavities or convexities of the magnetic body of the present embodiment. It is preferable that the magnetic body has, as shown in FIG. 14, any one or both of a plurality of concavities and a plurality of convexities arranged in a first direction on the principal plane, each of the concavities or convexities having a length of 1 μm or more, a width of 0.1 μm or more, and an aspect ratio of 2 or more. The aspect ratio is defined as the size in the longitudinal direction/size in the transverse direction. That is, when the length side is larger (longer) than the width, the aspect ratio is defined as length/width, and when the width is larger (longer) than the length, the aspect ratio is defined as width/length. It is more preferable that the length side is larger (longer) than the width because the concavity or convexity is likely to have magnetically uniaxial anisotropy. Furthermore, concavities or convexities are arranged in the first direction on the principal plane. Here, the phrase "arranged in the first direction" means that concavities or convexities are arranged so as to have the longer sides of the length and the width in parallel to the first direction. When the longer sides of the length and the width of the concavities or convexities are arranged within ±30 degrees from a direction parallel to the first direction, it is considered that the concavities or convexities are "arranged in the first direction". Due to these, the magnetic bodies are likely to have magnetically uniaxial anisotropy in the first direction (differences in the magnetic permeabilities are likely to occur) as a result of the effect of shape magnetic anisotropy, and thus it is preferable. From this point of view, more preferably, the width is preferably 1 μm or more, and the length is preferably 10 μm or more. The aspect ratio is preferably 5 or more, and more preferably 10 or more. By including these concavities or convexities, the adhesiveness between the magnetic bodies at the time of synthesizing a compressed powder material by powder compressing the magnetic bodies (the concavities or convexities bring an anchoring effect of adhering particles) is increased, and thereby mechanical characteristics such as strength and hardness, or thermal stability is enhanced. Thus, it is preferable. When the principal plane is inside the magnetic body as in the case of a flat rotating ellipse, it is preferable that the magnetic body has any one or both of a plurality of concavities and a plurality of convexities arranged in the first direction on the surface as viewed from a direction perpendicular to the principal plane, each of the concavities or convexities having a length of 1 µm or more, a width of 0.1 µm or more, and an aspect ratio of 2 or more.

FIG. 14 shows a magnetic body 2, a principal plane 2a, concavities 12a, and convexities 12b. In the same diagram, a flaky particle is shown as an example; however, the magnetic body may also be a thin band (ribbon), a thin film, a thick film, or a plate-shaped member.

Regarding the magnetic body, it is preferable that at least a portion of the surface of the magnetic body is covered with a coating layer having a thickness of from 0.1 nm to 1 µm and containing at least one secondary element selected from the group consisting of oxygen (O), carbon (C), nitrogen (N), and fluorine (F).

It is more preferable that the coating layer contains at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and also contains at least one secondary element selected from the group consisting of oxygen (O), carbon (C), nitrogen (N), and fluorine (F). Regarding the non-magnetic metal, Al and Si are particularly preferred from the viewpoint of thermal stability. When the magnetic body contains at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, it is more preferable that the coating layer contains at least one non-magnetic metal that is the same as the non-magnetic metal as one of the constituent components of the magnetic body. Among oxygen (O), carbon (C), nitrogen (N), and fluorine (F), it is preferable that the coating layer contains oxygen (O), and it is preferable that the material is an oxide or a composite oxide. The description given above is from the viewpoints of the ease of forming the coating layer, oxidation resistance, and thermal stability. Based on the description above, the adhesiveness between the magnetic body and the coating layer can be enhanced, and the thermal stability and oxidation resistance of the magnetic wedge can be enhanced. The coating layer not only enhances the thermal stability or oxidation resistance of the magnetic body, but can also enhance the electrical resistance of the magnetic body. By increasing the electrical resistance, the eddy current loss is suppressed, and the frequency characteristics of the magnetic permeability can be enhanced. Therefore, it is preferable that the coating layer 14 has electrically high resistance, and for example, it is preferable that the coating layer 14 has a resistance value of 1 mΩ·cm or more.

The presence of the coating layer is also preferable from a magnetic viewpoint. Since the magnetic body has a small thickness size compared to the size of the flat surface, the magnetic body can be considered as a pseudo-thin film. At this time, a magnetic body having a coating layer formed on the surface and integrated with the magnetic body can be considered as a pseudo-laminated thin film structure, and the magnetic domain structure is stabilized in terms of energy. Thereby, the coercivity can be reduced (thereby, the hysteresis loss is reduced), and thus it is preferable. At this time, the magnetic permeability also increases, which is preferable. From such a viewpoint, it is more preferable that the coating layer is non-magnetic (the magnetic domain structure can be easily stabilized).

It is more preferable as the thickness of the coating layer is thicker, from the viewpoints of thermal stability, oxidation resistance, and electrical resistance. However, if the thickness of the coating layer is too thick, since the saturation magnetization is reduced, the magnetic permeability also decreases, which is not preferable. Also, from a magnetic viewpoint, if the thickness becomes too thick, the "effect by which the magnetic domain structure is stabilized, and lowered coercivity, reduced losses, and increased magnetic permeability are achieved" is reduced. In consideration of the above-described matters, the thickness of the coating layer is preferably from 0.1 nm to 1 µm, and more preferably from 0.1 nm to 100 m.

It is preferable to have an intermediate phase containing at least one element selected from the group consisting of oxygen (O), carbon (C), nitrogen (N), and fluorine (F), between the magnetic bodies. It is because the electrical resistance of the intermediate phase is increased thereby, and the eddy current loss of the magnetic wedge can be reduced. From this point of view, it is preferable that the electrical resistance of the intermediate phase is higher than that of the magnetic bodies. Since the intermediate phase exists so as to surround the magnetic bodies, oxidation resistance and thermal stability of the flaky particles can be enhanced, and thus it is preferable. It is more preferable that the intermediate phase contains oxygen therein, from the viewpoints of high oxidation resistance and high thermal stability. Since the intermediate phase also plays the role of mechanically adhering magnetic bodies to other magnetic bodies, it is preferable also from the viewpoint of high strength. For example, FIG. 10 shows the intermediate phase 20; however, the form of the intermediate phase 20 is not limited to this.

Furthermore, since the intermediate phase also plays the role of mechanically adhering magnetic bodies to other magnetic bodies, it is preferable that at least one or more reinforcing materials selected from glass fibers, carbon fibers, silicon carbide fibers, boron fibers, alumina fibers, aramid fibers, PBO fibers, polyallylate fibers, polyethylene fibers, polyolefin fibers, vinylon fibers, polyester fibers, and nylon fibers are mixed into the intermediate phase.

In regard to the magnetic wedge of the present embodiment, the magnetic permeability in the rotational direction is lowered by providing non-magnetic bodies inside the magnetic wedge, and further reduction of the leakage flux that flows between the iron core teeth via the magnetic wedge can be promoted.

Furthermore, regarding the magnetic wedge of the present embodiment, the mechanical strength of the magnetic wedge can be further increased by covering the surface of the magnetic wedge with a resin. In this case, the resin is not particularly limited; however, a polyester-based resin, a polyethylene-based resin, a polystyrene-based resin, a polyvinyl chloride-based resin, a polyvinyl butyral resin, a polyvinyl alcohol resin, a polybutadiene-based resin, a TEFLON (registered trademark)-based resin, a polyurethane resin, a cellulose-based resin, an ABS resin, a nitrile-butadiene-based rubber, a styrene-butadiene-based rubber, a silicone resin, other synthetic rubbers, natural rubber, an epoxy resin, a phenolic resin, an allyl resin, a polybenzimidazole resin, an amide-based resin, a polyimide-based resin, a polyamideimide resin, or a copolymer thereof is used. It is particularly preferable that the resin includes a silicone resin or a polyimide resin, which have high heat resistance.

Next, the effects of the present embodiment will be explained.

Here, as an example, the results of an electromagnetic field value analysis obtained by a finite element method carried out using a radial gap type rotating electrical machine are shown in Table 1. Examples are magnetic wedges, each of which is formed by disposing the principal planes of the magnetic bodies perpendicularly to the axial direction of the rotating electrical machine and has differences in the magnetic permeabilities depending on the direction in the principal plane of each magnetic body. That is, the magnetic bodies have differences in the magnetic permeabilities in three directions, namely, the axial direction magnetic permeability $\mu z$, the rotational direction magnetic permeability $\mu\theta$, and the diametric direction magnetic permeability $\mu r$, and the magnetic bodies are disposed such that the magnetic permeabilities increase in the order of the diametric direction, the rotational direction, and the axial direction (such that diametric direction magnetic permeability $\mu r$> rotational direction magnetic permeability $\mu\theta$> axial direction magnetic permeability $\mu z$).

Here, the effect obtainable when magnetic anisotropy is imparted to the principal planes of magnetic bodies in a magnetic wedge formed by laminating magnetic bodies in the axial direction, and the rotational direction magnetic permeability $\mu\theta$ is made lower than the diametric direction magnetic permeability $\mu r$, has been described. However, the effect obtainable when magnetic anisotropy is imparted to the principal planes of magnetic bodies in a magnetic wedge formed by disposing the principal planes of the magnetic bodies perpendicularly to the rotational direction to the rotating electrical machine, and the axial direction magnetic permeability $\mu z$ is made lower than the diametric direction magnetic permeability $\mu r$, that is, the difference in the effects between the case in which diametric direction magnetic permeability $\mu r$> axial direction magnetic permeability $\mu z$> rotational direction magnetic permeability $\mu\theta$ and the case in which diametric direction magnetic permeability $\mu r$=axial direction magnetic permeability $\mu z$> rotational direction magnetic permeability $\mu\theta$, can also be similarly checked.

In regard to an axial type rotating electrical machine, the effects of the magnetic wedge of the present embodiment can be checked in the same manner.

According to the magnetic wedge of the present embodiment, there is provided a magnetic wedge in which the increase in the leakage flux is suppressed to a minimum level

TABLE 1

| $\mu r$ | $\mu\theta$ | $\mu z$ | Proportion of leakage flux (%) | Proportion of effective flux (%) | Pulsation rate of air-gap flux (%) | Loss (kW) | Torque (Nm) | Efficiency (%) |
| --- | --- | --- | --- | --- | --- | --- | --- | --- |
| 50 | 50 | 2 | 4.08 | 87.6 | 24.5 | 4.55 | 640 | 97.0 |
| 50 | 25 | 2 | 3.13 | 90.1 | 24.2 | 4.38 | 644 | 97.1 |

Meanwhile, Comparative Examples are magnetic wedges, each of which is formed by disposing the principal planes of the magnetic bodies perpendicularly to the axial direction of the rotating electrical machine and has the same magnetic permeability in all directions in the principal plane. That is, differences in the magnetic permeabilities in two directions, namely, the rotational direction and the diametric direction, cannot be provided (diametric direction magnetic permeability $\mu r$=rotational direction magnetic permeability $\mu\theta$> axial direction magnetic permeability $\mu z$).

By making a comparison between the Examples and the Comparative Examples, an effect obtainable when magnetic anisotropy is imparted to the principal planes of magnetic bodies in a magnetic wedge formed by disposing the principal planes of the magnetic bodies perpendicularly to the axial direction of the rotating electrical machine, and the rotational direction magnetic permeability $\mu\theta$ is made lower than the diametric direction magnetic permeability $\mu r$, can be demonstrated.

As is obvious from the analysis results of Table 1, since the magnetic wedges of the Examples have lower rotational direction magnetic permeabilities $\mu\theta$ than the magnetic wedges of the Comparative Examples, the proportion of the leakage flux can be made smaller, and thus, it is understood that that the magnetic wedges of the Examples are magnetic wedges suitable for increasing the efficiency of rotating electrical machines. Furthermore, in regard to this analysis, it has been confirmed that a decrease in the loss caused by pulsation mitigation of the air-gap flux distribution, and an increase in the torque caused by an increase in the effective flux contribute to an increase in the efficiency of the rotating electrical machine; however, it does not matter even if the contribution may come from any one of them only.

and the pulsation of the magnetic flux distribution in the iron core surface part can be effectively mitigated, and thus, the efficiency of a rotating electrical machine can be increased. Depending on cases, the effective flux (main magnetic flux) can be increased, and the torque of the rotating electrical machine can also be enhanced. Furthermore, when the magnetic wedge is configured using magnetic bodies having a principal plane, the width of control of the magnetic permeabilities in three directions can be extended, and thus, the efficiency of the rotating electrical machine can be enhanced. Also, production is made easier, the production yield increases, and the production cost can be reduced.

Second Embodiment

The rotating electrical machine of the present embodiment is characterized by including the magnetic wedge of the first embodiment. Therefore, any matters that overlap with the first embodiment will not be described herein. According to the present specification, a rotating electrical machine means a concept that includes all of an electric motor (motor), an electricity generator (generator), and a motor-generator that accomplishes the functions of both a motor and a generator as necessary.

A radial gap type motor of the present embodiment is characterized by having a magnetic wedge in which magnetic bodies having a principal plane are disposed such that the principal planes are approximately perpendicular to the air-gap surface, and differences have been imparted to the magnetic permeabilities in three directions, namely, the axial direction magnetic permeability, the rotational direction magnetic permeability, and the diametric direction magnetic permeability.

Figure 15:
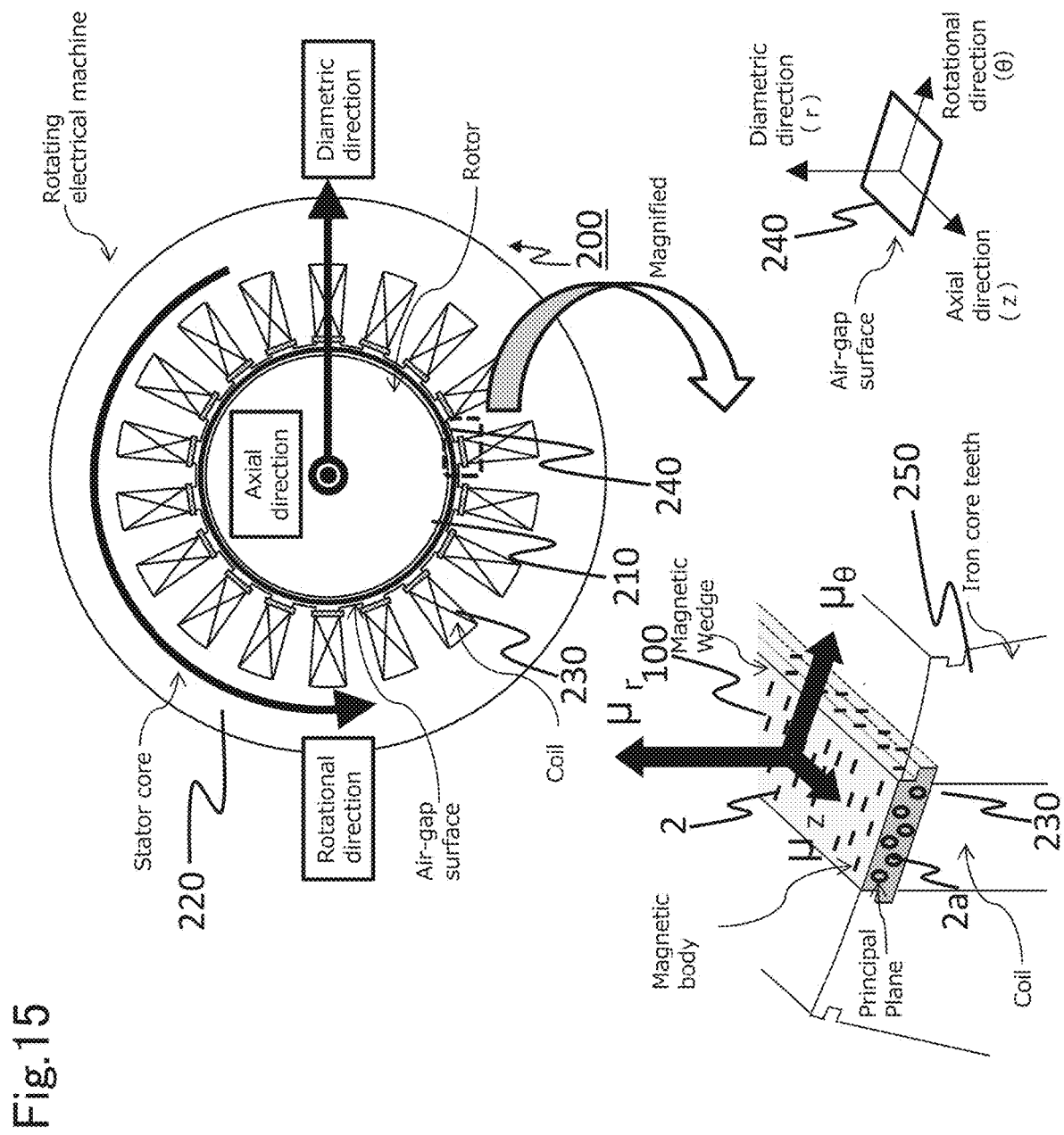
FIG. 15 is a schematic diagram illustrating an example of a radial gap type rotating electrical machine of a second embodiment.

FIG. 15 is a schematic diagram illustrating an example of the radial gap type rotating electrical machine of the present embodiment. FIG. 15 is an example of the radial gap type motor of the present embodiment. A radial gap type rotating electrical machine has a rotor, and a stator that is disposed to face this rotor so as to have a predetermined gap in the diametric direction. In FIG. 15, the rotor is disposed on the inner side of the stator; however, it does not matter even if the rotor is disposed on the outer side. The rotor includes a rotor core and a shaft and is supported so as to be able to rotate. Meanwhile, the stator includes a stator core; field coils inserted into slots of the stator core; and magnetic wedges held at the wedge grooves of the slot openings. In FIG. 15, the magnetic wedge is illustrated by taking, as an example, the case in which the magnetic bodies are disposed such that the diametric direction magnetic permeability μr is higher than the rotational direction magnetic permeability μθ and the axial direction magnetic permeability μz; however, the magnetic wedge is not limited to this.

As such, when the magnetic wedge has differences in the magnetic permeabilities in three directions, namely, the axial direction magnetic permeability μz, the rotational direction magnetic permeability μθ, and the diametric direction magnetic permeability μr, a decrease in the harmonic loss occurring at the rotor surface part can be promoted while an increase in the leakage flux is suppressed. Furthermore, since the magnetic flux that passes through the air-gap increases, the torque of the radial gap type motor is increased. Through any one or both of the loss reducing effect and the torque increasing effect described above, efficiency increase can be realized.

In the diagram, a flaky particle is used; however, a magnetic body of a thin band (ribbon), a thin film, a thick film, or a plate-shaped member may also be used.

Regarding the material for the iron core, any of a laminated core of magnetic thin plates, a pressed powder core obtained by compression molding magnetic particles, a ferrite core, and the like may be employed.

Particularly, in regard to the radial gap type motor employing a laminated core of magnetic thin plates, in a case in which the principal planes of the magnetic bodies included in the magnetic wedge and the principal planes of the magnetic thin plates that form the laminated core are disposed parallel to each other, it is particularly preferable because the eddy current loss can be reduced.

Furthermore, the radial gap type motor may be any of a motor including a conductor in the rotor (induction motor), a motor including a permanent magnet (permanent magnet motor), and a motor including magnetic bodies (magnetic resistance motor).

An axial gap type motor of the present embodiment is characterized by having a magnetic wedge in which magnetic bodies having a principal plane are disposed such that the principal planes are approximately perpendicular to the air-gap surface, and differences have been imparted to the magnetic permeabilities in three directions, namely, the axial direction magnetic permeability, the rotational direction magnetic permeability, and the diametric direction magnetic permeability.

Figure 16:
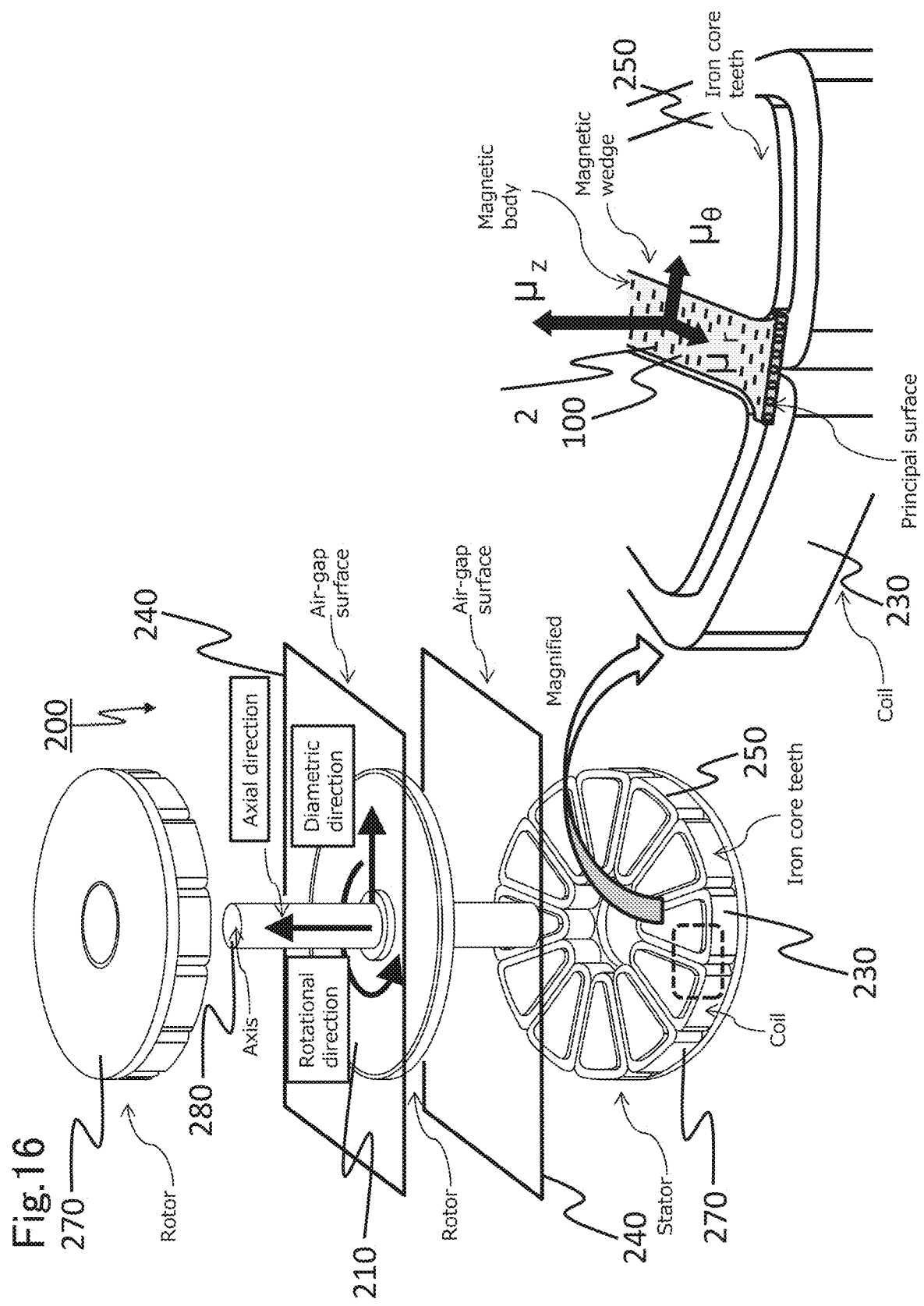
FIG. 16 is a schematic diagram illustrating an example of an axial gap type rotating electrical machine of the second embodiment.

FIG. 16 is a schematic diagram illustrating an example of the axial gap type rotating electrical machine of the present embodiment. FIG. 16 is an example of the axial gap type motor of the present embodiment. An axial gap type motor has a rotor, and a stator disposed to face this rotor so as to be separated with a predetermined gap in the axial direction, and the stator includes a stator core; field coils inserted into slots of the stator core; and magnetic wedges held at the wedge grooves of the slot openings. In FIG. 16, the magnetic wedge is illustrated by taking, as an example, the case in which the magnetic bodies are disposed such that the axial direction magnetic permeability μz is higher than the diametric direction magnetic permeability μr and the rotational direction magnetic permeability μθ; however, the magnetic wedge is not limited to this. As such, when the magnetic wedge has differences in the magnetic permeabilities in three directions, namely, the axial direction magnetic permeability μz, the rotational direction magnetic permeability μθ, and the diametric direction magnetic permeability μr, a decrease in the harmonic loss occurring at the rotor surface part can be promoted while an increase in the leakage flux is suppressed. Furthermore, since the magnetic flux that passes through the air-gap increases, the torque of the axial gap type motor is increased. Thereby, efficiency increase can be realized.

In FIG. 16, the rotor is disposed between two stators; however, it is also acceptable that the rotor is disposed on one side or on both sides of one stator.

In FIG. 16, a flaky particle is used; however, a magnetic body of a thin band (ribbon), a thin film, a thick film, or a plate-shaped member may also be used.

Regarding the material for the iron core, any of a laminated core of magnetic thin plates, a pressed powder core obtained by compression molding magnetic particles, a ferrite core, and the like may be employed. Particularly, in an axial gap type motor employing a laminated core of magnetic thin plates, in a case in which the principal planes of the magnetic bodies included in the magnetic wedge and the principal planes of the magnetic thin plates that form the laminated core are disposed to be parallel to each other, it is particularly preferable because the eddy current loss can be reduced.

An electricity generator of the present embodiment is characterized by having a magnetic wedge in which magnetic bodies having a principal plane are disposed such that the principal planes are approximately perpendicular to the air-gap surface, and differences have been imparted in the magnetic permeabilities in three directions, namely, the axial direction, the rotational direction, and the diametric direction.

Figure 17:
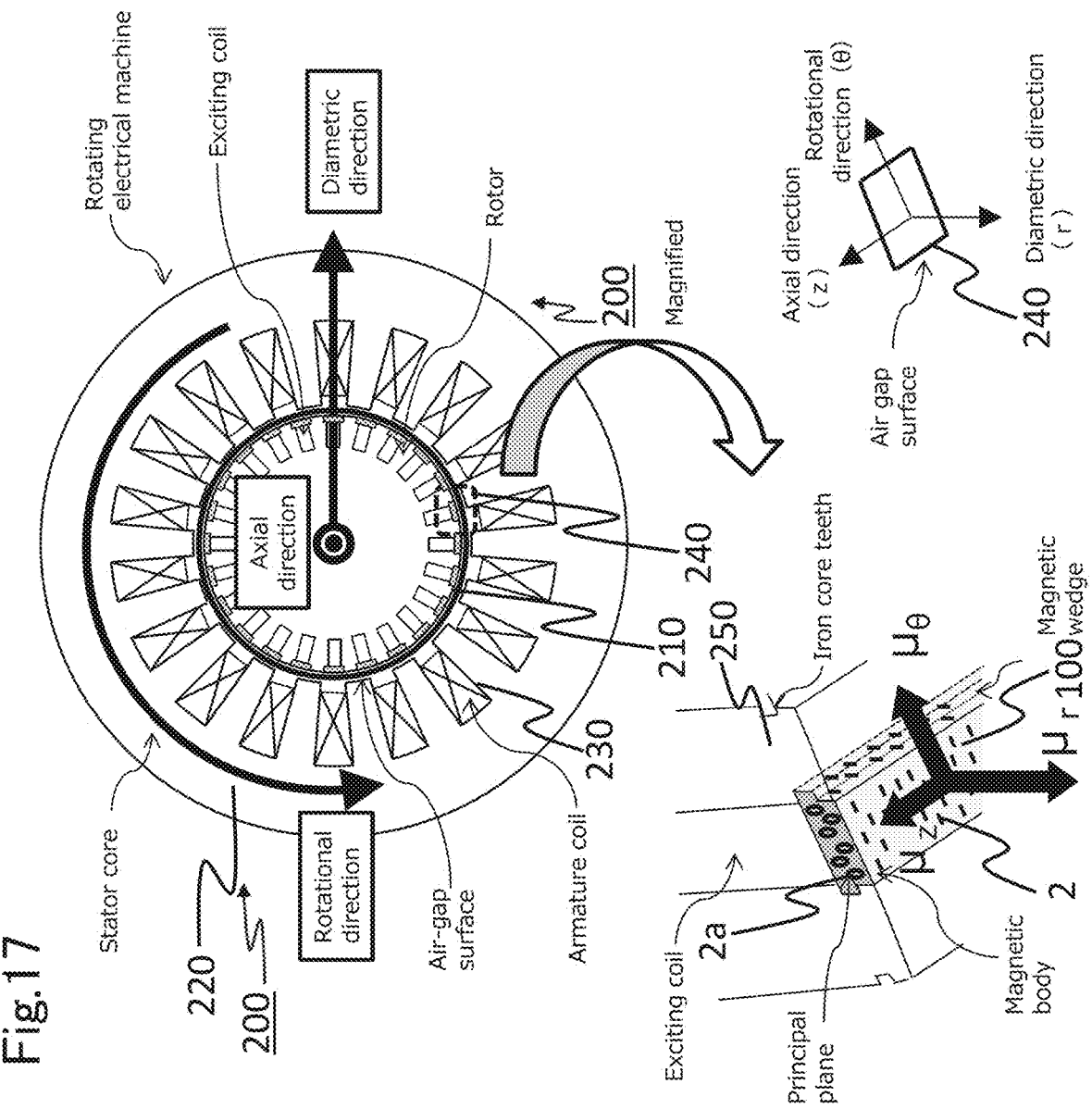
FIG. 17 is a schematic diagram illustrating an example of an electricity generator of the second embodiment.

FIG. 17 is a schematic diagram illustrating an example of the electricity generator of the present embodiment. An electricity generator usually has a rotor that accommodates exciting coils in slots of a rotor core (in addition to this, a rotor having permanent magnets as excitation sources may also be employed); and a stator that accommodates armature coils in slots of a stator core, and by rotating the rotator and passing an excitation current to the exciting coils, electric power is generated in the armature coils. The rotor includes a rotor core; field coils inserted into slots of the rotor core; and magnetic wedges held at the wedge grooves of the slot openings, and the rotor is supported by bearings so as to be able to rotate. In FIG. 17, the magnetic wedge is illustrated by taking, as an example, the case in which the magnetic bodies are disposed such that the diametric direction magnetic permeability μr is higher than the rotational direction magnetic permeability μθ and the axial direction magnetic permeability μz; however, the magnetic wedge is not limited to this.

As such, when the magnetic wedge has differences in the magnetic permeabilities in three directions, namely, the axial direction magnetic permeability μz, the rotational direction magnetic permeability μθ, and the diametric direction magnetic permeability μr, the harmonic loss occurring at the stator surface part can be decreased while an increase in the leakage flux is suppressed. Furthermore, since the magnetic flux that passes through the air-gap and interlinks with the armature coils increases, the generation voltage induced in the armature coils is increased. Thereby, efficiency increase can be realized.

In FIG. 17, magnetic wedges are disposed at the slot openings of the rotor core; however, it is also acceptable that the magnetic wedges are disposed at the slot openings of the stator core. Furthermore, in the diagram, a coil type electricity generator including exciting coils in the rotor is illustrated; however, the electricity generator may also be a permanent magnet type electricity generator including permanent magnets in the rotor. In this case, the magnetic wedges are disposed at the slot openings of the stator core.

In FIG. 17, a flaky particle is used; however, a magnetic body of a thin band (ribbon), a thin film, a thick film, or a plate-shaped member may also be used.

Regarding the material for the iron core, any of a laminated core of magnetic thin plates, a pressed powder core obtained by compression molding magnetic particles, a ferrite core, and the like may be employed. Particularly, in an electricity generator employing a laminated core of magnetic thin plates, in a case in which the principal planes of the magnetic bodies included in the magnetic wedge and the principal planes of the magnetic thin plates that form the laminated core are disposed to be parallel to each other, it is particularly preferable because the eddy current loss can be reduced.

Figure 18:
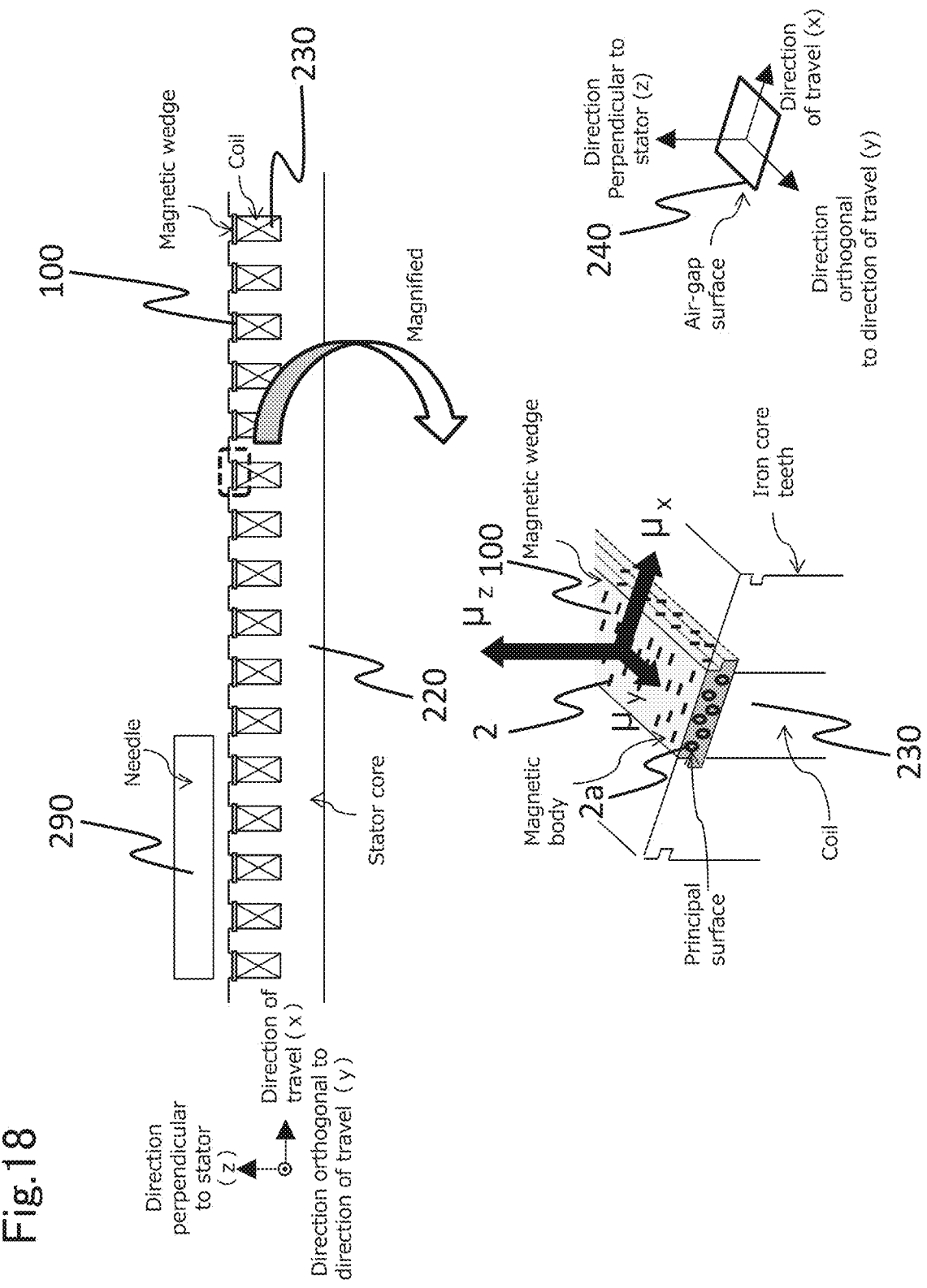
FIG. 18 is a schematic diagram illustrating an example of a linear motor of the second embodiment.

A linear motor is a motor obtained by spreading a radial gap type motor open to a flat-shaped structure, and therefore, the magnetic wedge of the present invention can also be applied to a linear motor. That is, a stator includes a stator core and field coils inserted into slots of the stator core, and magnetic wedges may be provided at the slot openings. FIG. 18 is a schematic diagram illustrating an example of the linear motor of the present embodiment. In the linear motor, the direction of travel of a needle, a direction orthogonal to the direction of travel of the needle, and a direction perpendicular to the stator correspond to the rotational direction, the axial direction, and the diametric direction of the radial gap type motor, respectively.

At this time, regarding the magnetic characteristics of the magnetic wedge, it is preferable that differences are imparted to the magnetic permeabilities in three directions, namely, the magnetic permeability $\mu z$ in a direction perpendicular to the stator, the magnetic permeability $\mu x$ in the direction of travel of the needle, and the magnetic permeability $\mu y$ in a direction orthogonal to the direction of travel, in the magnetic wedge as illustrated in FIG. 18. In FIG. 18, the magnetic bodies are disposed such that the magnetic permeability $\mu z$ in a direction perpendicular to the stator is higher than the magnetic permeability $\mu x$ in the direction of travel of the needle and the magnetic permeability $\mu y$ in a direction orthogonal to the direction of travel; however, the disposition is not limited to this. Thereby, a decrease in the harmonic loss occurring at the needle surface part can be promoted while an increase in the leakage flux is suppressed. Furthermore, since the magnetic flux that passes through the air-gap increases, the thrust of the linear motor is increased. As a result, efficiency increase can be realized. FIG. 18 shows a needle 290.

In FIG. 18, a flaky particle is used; however, a magnetic body of a thin band (ribbon), a thin film, a thick film, or a plate-shaped member may also be used.

According to the rotating electrical machine of the present embodiment, an increase in the leakage flux caused by the use of magnetic wedges can be suppressed, and the pulsation of the magnetic flux distribution at the iron core surface part can be mitigated effectively. Therefore, efficiency increase can be realized.

The slot shape of the rotating electrical machine of the present embodiment may be a half-closed slot (or semi-closed slot); however, the slot shape is preferably an open slot (or opening slot or open slot). In this case, it is preferable because the harmonic loss can be decreased to a large extent.

The rotating electrical machine of the present embodiment can be applied to transportation systems such as railways, electric vehicles, and hybrid cars; social systems such as elevators and air-conditioners; industrial systems such as robots, pumps, compressors, and ventilators; energy systems such as thermal power generators, hydroelectric generators, wind power generators, atomic power generators, and geothermal power generators; and electric appliances such as washing machines, and efficiency increase in the systems can be promoted. Particularly, in large capacity equipment for industrial use, since open slots are generally employed for the slot shape, it is preferable that the large capacity equipment includes the magnetic wedge of the first embodiment. Furthermore, in traction motors for railways, former-wound coils are used due to the necessity for withstanding high voltage and vibration, and open slots are employed for the slot shape. Therefore, it is preferable that the traction motors include the magnetic wedge of the first embodiment.

Particularly, in railways, since the loss of rotating electrical machines occupies approximately a half of the amount of power consumption during the travel by rail, the effect of increasing the efficiency by reducing the loss of the rotating electrical machines is significant. Furthermore, in electric vehicles and hybrid cars, the efficiency of the traction motors can be increased by using the magnetic wedge of the first embodiment, and therefore, the cruising distance can be increased.

Several embodiments and Examples of the present invention have been described; however, these embodiments have been suggested only as examples and are not intended to limit the scope of the invention. These novel embodiments and Examples can be carried out in various other forms, and various omissions, replacements, and modifications can be implemented to the extent that the gist of the invention is maintained. These embodiments or Examples and modifications thereof are construed to be included in the scope or gist of the invention and to be included in the inventions described in the claims as well as equivalents thereof.

What is claimed is:

1. A magnetic wedge used for a radial gap type rotating electrical machine in which a stator is disposed to face a rotor with a predetermined distance provided in a diametric direction, the magnetic wedge comprising flaky particles, each of the flaky particles having a planar structure having a principal plane, at least one magnetic element selected from the group consisting of iron (Fe), cobalt (Co), and nickel (Ni), a thickness of from 10 nm to 100 μm, and the ratio of the average length in the principal plane with respect to the thickness being from 5 to 10,000, wherein the principal plane is disposed in an oriented manner along the rotational direction and disposed approximately perpendicularly to the air-gap surface between a stator and a rotor of the rotating electrical machine, and wherein the diametric direction magnetic permeability in the direction of the diameter is higher than the rotational direction magnetic permeability in the direction of rotation of the rotating electrical machine, and the rotational direction magnetic permeability in the direction of rotation of the rotating electrical machine is higher than the axial direction magnetic permeability in the axial direction of the rotating electrical machine.

2. A rotating electrical machine comprising the magnetic wedge according to claim 1.

3. A magnetic wedge used for a radial gap type rotating electrical machine in which a stator is disposed to face a rotor with a predetermined distance provided in a diametric direction, the magnetic wedge comprising flaky particles, each of the flaky particles having a planar structure having a principal plane, at least one magnetic element selected from the group consisting of iron (Fe), cobalt (Co), and nickel (Ni), a thickness of from 10 nm to 100 µm, and the ratio of the average length in the principal plane with respect to the thickness being from 5 to 10,000,
wherein the principal plane is disposed approximately perpendicular to the rotational direction and disposed approximately perpendicularly to the air-gap surface between a stator and a rotor of the rotating electrical machine,
and wherein the diametric direction magnetic permeability in the direction of the diameter of the rotating electrical machine is higher than the axial direction magnetic permeability in the axial direction of the rotating electrical machine, and the axial direction magnetic permeability in the axial direction of the rotating electrical machine is higher than the rotational direction magnetic permeability in the rotational direction of the rotating electrical machine.

4. A magnetic wedge used for an axial gap type rotating electrical machine in which a stator is disposed to face a rotor with a predetermined distance provided in an axial direction, the magnetic wedge comprising flaky particles, each of the flaky particles having a planar structure having a principal plane, at least one magnetic element selected from the group consisting of iron (Fe), cobalt (Co), and nickel (Ni), a thickness of from 10 nm to 100 µm, and the ratio of the average length in the principal plane with respect to the thickness being from 5 to 10,000,
wherein the principal plane is disposed in an oriented manner along the rotational direction and disposed approximately perpendicularly to the air-gap surface between a stator and a rotor of the rotating electrical machine,
and wherein the axial direction magnetic permeability in the axial direction of the rotating electrical machine is higher than the rotational direction magnetic permeability in the direction of rotation of the rotating electrical machine, and the rotational direction magnetic permeability in the direction of rotation of the rotating electrical machine is higher than the diametric direction magnetic permeability in the direction of the diameter of the rotating electrical machine.

5. A magnetic wedge used for an axial gap type rotating electrical machine in which a stator is disposed to face a rotor with a predetermined distance provided in an axial direction, the magnetic wedge comprising flaky particles, each of the flaky particles having a planar structure having a principal plane, at least one magnetic element selected from the group consisting of iron (Fe), cobalt (Co), and nickel (Ni), a thickness of from 10 nm to 100 µm, and the ratio of the average length in the principal plane with respect to the thickness being from 5 to 10,000,
wherein the principal plane is disposed approximately perpendicular to the rotational direction and disposed approximately perpendicularly to the air-gap surface between a stator and a rotor of the rotating electrical machine,
and wherein the axial direction magnetic permeability in the axial direction of the rotating electrical machine is higher than the diametric direction magnetic permeability in the direction of the diameter of the rotating electrical machine, and the diametric direction magnetic permeability in the direction of the diameter of the rotating electrical machine is higher than the rotational direction magnetic permeability in the direction of rotation of the rotating electrical machine.

6. A magnetic wedge used for a radial gap type rotating electrical machine in which a stator is disposed to face a rotor with a predetermined distance provided in a diametric direction, the magnetic wedge comprising flaky particles, each of the flaky particles having a planar structure having a principal plane, at least one magnetic element selected from the group consisting of iron (Fe), cobalt (Co), and nickel (Ni), a thickness of from 10 nm to 100 µm, and the ratio of the average length in the principal plane with respect to the thickness being from 5 to 10,000,
wherein the principal plane is disposed in an oriented manner along the rotational direction and disposed approximately perpendicularly to the air-gap surface between a stator and a rotor of the rotating electrical machine,
and wherein the diametric direction coercivity in the direction of the diameter is lower than the rotational direction coercivity in the direction of rotation of the rotating electrical machine, and the rotational direction coercivity in the direction of rotation of the rotating electrical machine is lower than the axial direction coercivity in the axial direction of the rotating electrical machine.

7. A magnetic wedge used for a radial gap type rotating electrical machine in which a stator is disposed to face a rotor with a predetermined distance provided in a diametric direction, the magnetic wedge comprising flaky particles, each of the flaky particles having a planar structure having a principal plane, at least one magnetic element selected from the group consisting of iron (Fe), cobalt (Co), and nickel (Ni), a thickness of from 10 nm to 100 µm, and the ratio of the average length in the principal plane with respect to the thickness being from 5 to 10,000,
wherein the principal plane is disposed approximately perpendicular to the rotational direction and disposed approximately perpendicularly to the air-gap surface between a stator and a rotor of the rotating electrical machine,
and wherein the diametric direction coercivity in the direction of the diameter of the rotating electrical machine is lower than the axial direction coercivity in the axial direction of the rotating electrical machine, and the axial direction coercivity in the axial direction of the rotating electrical machine is lower than the rotational direction coercivity in the rotational direction of the rotating electrical machine.

8. A magnetic wedge used for an axial gap type rotating electrical machine in which a stator is disposed to face a rotor with a predetermined distance provided in an axial direction, the magnetic wedge comprising flaky particles, each of the flaky particles having a planar structure having a principal plane, at least one magnetic element selected from the group consisting of iron (Fe), cobalt (Co), and nickel (Ni), a thickness of from 10 nm to 100 µm, and the ratio of the average length in the principal plane with respect to the thickness being from 5 to 10,000, wherein the principal plane is disposed in an oriented manner along the rotational direction and disposed approximately perpendicularly to the air-gap surface between a stator and a rotor of the rotating electrical machine, and wherein the axial direction coercivity in the axial direction of the rotating electrical machine is lower than the rotational direction coercivity in the direction of rotation of the rotating electrical machine, and the rotational direction coercivity in the direction of rotation of the rotating electrical machine is lower than the diametric direction coercivity in the direction of the diameter of the rotating electrical machine.

9. A magnetic wedge used for an axial gap type rotating electrical machine in which a stator is disposed to face a rotor with a predetermined distance provided in an axial direction, the magnetic wedge comprising flaky particles, each of the flaky particles having a planar structure having a principal plane, at least one magnetic element selected from the group consisting of iron (Fe), cobalt (Co), and nickel (Ni), a thickness of from 10 nm to 100 μm, and the ratio of the average length in the principal plane with respect to the thickness being from 5 to 10,000, wherein the principal plane is disposed approximately perpendicular to the rotational direction and disposed approximately perpendicularly to the air-gap surface between a stator and a rotor of the rotating electrical machine, and wherein the axial direction coercivity in the axial direction of the rotating electrical machine is lower than the diametric direction coercivity in the direction of the diameter of the rotating electrical machine, and the diametric direction coercivity in the direction of the diameter of the rotating electrical machine is lower than the rotational direction coercivity in the direction of rotation of the rotating electrical machine.

10. A rotating electrical machine comprising the magnetic wedge of claim 3.

11. A rotating electrical machine comprising the magnetic wedge of claim 4.

12. A rotating electrical machine comprising the magnetic wedge of claim 5.

13. A rotating electrical machine comprising the magnetic wedge of claim 6.

14. A rotating electrical machine comprising the magnetic wedge of claim 7.

15. A rotating electrical machine comprising the magnetic wedge of claim 8.

16. A rotating electrical machine comprising the magnetic wedge of claim 9.

* * * * *